US010895509B2

(12) United States Patent
Burger

(10) Patent No.: US 10,895,509 B2
(45) Date of Patent: Jan. 19, 2021

(54) DYNAMIC SCANNING OF REMOTE TEMPERATURE SENSORS

(71) Applicant: Google LLC, Mountain View, CA (US)

(72) Inventor: Eric Michael Burger, Redwood City, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/954,386

(22) Filed: Apr. 16, 2018

(65) Prior Publication Data
US 2019/0277704 A1    Sep. 12, 2019

Related U.S. Application Data

(63) Continuation-in-part of application No. 15/913,409, filed on Mar. 6, 2018.

(51) Int. Cl.
| G01K 3/10 | (2006.01) |
| G01K 1/02 | (2006.01) |
| F24F 11/56 | (2018.01) |
| F24F 11/54 | (2018.01) |
| F24F 11/66 | (2018.01) |
| G01K 3/14 | (2006.01) |

(52) U.S. Cl.
CPC ............... *G01K 3/10* (2013.01); *F24F 11/54* (2018.01); *F24F 11/56* (2018.01); *F24F 11/66* (2018.01); *G01K 1/024* (2013.01); *G01K 3/14* (2013.01)

(58) Field of Classification Search
None
See application file for complete search history.

(56) References Cited

U.S. PATENT DOCUMENTS 9,696,052 B2   7/2017   Malchiondo et al.
9,702,579 B2   7/2017   Warren et al.
(Continued)

FOREIGN PATENT DOCUMENTS

WO     02-09363 A2     1/2002

OTHER PUBLICATIONS

Extended European Search Report dated Jul. 31, 2019 in European Patent Application No. 19168352.3, all pages.
(Continued)

*Primary Examiner* — Mohammad Ali
*Assistant Examiner* — Saad M Kabir
(74) *Attorney, Agent, or Firm* — Kilpatrick Townsend & Stockton LLP

(57) ABSTRACT

A thermostat method includes receiving temperature readings from a remote temperature sensor; operating a processor in a first mode and a second mode, where the processor uses more average power when operating in the second mode than when operating in the first mode; and repeatedly transitioning the processor between operating in the first mode and operating in the second mode. Transitions from operating in the first mode to operating the second mode are caused at least in part by an expiration of a first time interval. The thermostat receives one or more of the temperature readings from the remote temperature sensor while the processor is operating in the second mode. The method also includes adjusting a length of the first time interval based at least in part on an estimate of how fast the temperature readings from the remote temperature sensor are approaching a threshold.

19 Claims, 16 Drawing Sheets

(56) References Cited

U.S. PATENT DOCUMENTS

| | | |
|---|---|---|
| 2005/0040249 A1 | 2/2005 | Wacker et al. |
| 2007/0040040 A1 | 2/2007 | Mueller |
| 2009/0236433 A1 | 9/2009 | Mueller et al. |
| 2010/0006660 A1 | 1/2010 | Leen et al. |
| 2012/0305661 A1* | 12/2012 | Malchiondo ............ F24F 11/30 236/44 A |
| 2012/0325919 A1* | 12/2012 | Warren ............. G05D 23/1902 236/1 C |
| 2013/0178986 A1 | 7/2013 | Lombard et al. |
| 2016/0146495 A1 | 5/2016 | Malve et al. |
| 2016/0153674 A1 | 6/2016 | Lancaster |
| 2017/0102153 A1 | 4/2017 | O'Hayer |
| 2017/0176035 A1 | 6/2017 | Reeder et al. |

OTHER PUBLICATIONS

Non-Final Office action dated Jun. 13, 2019 in U.S. Appl. No. 15/913,409, all pages.

Extended European Search Report dated Jun. 14, 2019 in European Patent Application No. 19160730.8, all pages.

Wollerton, M. "Ecobee's room sensors get smarter with HomeKit: You can now check the current temperature and motion activity of Ecobee's room sensors in Apple's Home app for iPhone", Jan. 12, 2017, available from https://www.cnet.com/news/ecobees-room-sensors-get-smarter-with-homekit/, all pages.

Final Office Action dated Dec. 26, 2019 in U.S. Appl. No. 15/913,409, all pages.

* cited by examiner

DYNAMIC SCANNING OF REMOTE TEMPERATURE SENSORS

CROSS-REFERENCES TO RELATED APPLICATIONS

This application is a continuation-in-part of U.S. patent application Ser. No. 15/913,409, filed on Mar. 6, 2018, which is incorporated herein by reference.

TECHNICAL FIELD

This patent specification relates generally to using remote temperature sensor in conjunction with a smart-home, self-learning thermostat. More particularly, this disclosure describes automatically adjusting a dynamic scanning interval for receiving temperature updates from a remote temperature sensor for power efficiency.

BACKGROUND

A heating, ventilation, and air conditioning (HVAC) system situated in a residential or commercial building has a thermostat associated therewith. The building includes at least a first area (e.g., a room) and a second area and the thermostat is located in the first area. A user sets the thermostat to a desirable temperature, and the thermostat regulates the HVAC system based on the difference between the user-defined temperature and the temperature of the first area as sensed by the thermostat. Even when the user primarily occupies the second area, the thermostat continues to regulate the HVAC system in view of the sensed temperature of the first area notwithstanding that the temperature of the second area is different from the temperature of the first area.

BRIEF SUMMARY

A further understanding of the nature and advantages of the present invention may be realized by reference to the remaining portions of the specification and the drawings. Also note that other embodiments may be described in the following disclosure and claims.

In an embodiment, a temperature monitor and control system comprises a temperature monitoring device wirelessly coupled to a network. The system has a thermostat remote from the temperature monitoring device and configured to regulate a HVAC system. The thermostat is coupled to the network and has a processor and a memory comprising computer-readable instructions. The processor is configured to execute the instructions to wirelessly receive a first temperature from the temperature monitoring device, obtain a second temperature from the thermostat, and determine an offset based on a difference between the first temperature and the second temperature. The processor is also configured to execute the instructions to apply the offset to the thermostat to cause the thermostat to regulate the HVAC system in view of the first temperature. The processor is further configured to execute the instructions to override the applied offset in response to a determination that a fail-safe condition is met.

In another embodiment, a computer-implemented method for monitoring and controlling operation of a HVAC system within a structure comprises providing a thermostat configured to regulate the HVAC system. The method includes situating a plurality of battery-operated temperature monitoring devices within the structure. The method comprises receiving a user command. The user command includes a selection of at least one of the battery-operated temperature monitoring devices. The method comprises computing an offset based on an evaluation of a first temperature reading of the at least one selected battery-operated temperature monitoring device relative to a second temperature reading of the thermostat. The method includes applying the offset to the thermostat to cause the thermostat to regulate the HVAC system in view of the first temperature reading.

In yet another embodiment, a method for monitoring and controlling operation of a HVAC system within a structure comprises providing a thermostat configured to regulate the HVAC system. The method includes situating a plurality of battery-operated temperature monitoring devices within the structure and coupling the thermostat and each of the plurality of battery-operated temperature monitoring devices to a network. The method comprises receiving over the network a user command that includes a selection of at least one of the battery-operated temperature monitoring devices. The method includes computing at the thermostat an offset based on an evaluation of a first temperature reading of the at least one selected battery-operated temperature monitoring device relative to a second temperature reading of the thermostat. The method comprises applying the offset to the thermostat to cause the thermostat to regulate the HVAC system in view of the first temperature reading. The method includes overriding the applied offset in response to a determination that an override condition is met.

In some embodiments, a thermostat may include a wireless communication circuit that receives temperature readings from a remote temperature sensor, and a processor that operates in a plurality of modes. The plurality of modes may include a first mode and a second mode, where the processor uses more average power when operating in the second mode than when operating in the first mode. The thermostat may also include a memory including instructions that, when executed by the processor, cause the processor to repeatedly transition between operating in the first mode and operating in the second mode. Transitions from operating in the first mode to operating the second mode may be caused at least in part by an expiration of a first time interval. The wireless communication circuit may be configured to receive one or more of the temperature readings from the remote temperature sensor while the processor is operating in the second mode. The instructions may also cause the processor to adjust a length of the first time interval based at least in part on an estimate of how fast the temperature readings from the remote temperature sensor are approaching a threshold temperature.

In some embodiments, a method of receiving transmissions from remote temperature sensors by a thermostat may include receiving temperature readings from a remote temperature sensor through a wireless communication circuit, and operating a processor in a plurality of modes. The plurality of modes may include a first mode and a second mode, where the processor uses more average power when operating in the second mode than when operating in the first mode. The method may also include repeatedly transitioning the processor between operating in the first mode and operating in the second mode. Transitions from operating in the first mode to operating the second mode may be caused at least in part by an expiration of a first time interval. The wireless communication circuit may be configured to receive one or more of the temperature readings from the remote temperature sensor while the processor is operating in the second mode. The method may further include adjusting a length of the first time interval based at least in part on an estimate of how fast the temperature readings from the remote temperature sensor are approaching a threshold temperature.

In some embodiments, a temperature monitor and control system may include a remote temperature sensor installed in a first room in an enclosure and a thermostat installed in a second room in the enclosure. The thermostat may be configured to perform operations including receiving temperature readings from the remote temperature sensor through a wireless network, and operating a processor in a plurality of modes. The plurality of modes may include a first mode and a second mode. The processor may use more average power when operating in the second mode than when operating in the first mode. The operations may also include repeatedly transitioning the processor between operating in the first mode and operating in the second mode. Transitions from operating in the first mode to operating the second mode may be caused at least in part by an expiration of a first time interval. The thermostat may be configured to receive one or more of the temperature readings from the remote temperature sensor while the processor is operating in the second mode. The operations may further include adjusting a length of the first time interval based at least in part on an estimate of how fast the temperature readings from the remote temperature sensor are approaching a threshold temperature.

In any embodiments, one or more of the following features may be implemented in any combination and without limitation. The first mode may include a sleep mode. When the processor is operating in the sleep mode, the wireless communication circuit may also operate in the sleep mode. Transitions from operating in the second mode to operating in the first mode may be caused by an expiration of a second time interval. The second time interval is approximately 10 seconds. The memory and the processor may be part of a same integrated circuit (IC) package. The processor and the wireless communication circuit may be implemented in separate IC packages. Adjusting the length of the first time interval may be also based at least in part on a determination of whether the thermostat has transitioned from operating in the second mode to operating the first mode without receiving the one or more of the temperature readings from the remote temperature sensor. The threshold temperature may include an upper or lower boundary of a maintenance band. Adjusting the length of the first time interval may also be based at least in part on a determination of whether the HVAC system is actively heating or cooling. The operations/method may also include determining to enable the adjusting of the length of the first time interval. Determining to enable the adjusting of the length of the first time interval may be based at least in part on a voltage or change stored on an energy storage device. Determining to enable the adjusting of the length of the first time interval may be based at least in part on whether the HVAC system is being allowed to drift. Determining to enable the adjusting of the length of the first time interval may be based at least in part on when a delay following the initiation of an HVAC function has expired. The estimate of how fast the temperature readings from the remote temperature sensor are approaching a threshold temperature may include a determination of a time-to-temperature based on a thermal model of a room in which the remote temperature sensor is installed. The estimate of how fast the temperature readings from the remote temperature sensor are approaching a threshold temperature may include a determination of a time-to-temperature based on a temperature velocity. The temperature velocity may include a difference between successive temperature readings from the remote temperature sensor divided by a current length of the first time interval. The operations/method may also include determining whether a previous adjustment to the length of the first time interval resulted in a temperature overshoot.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
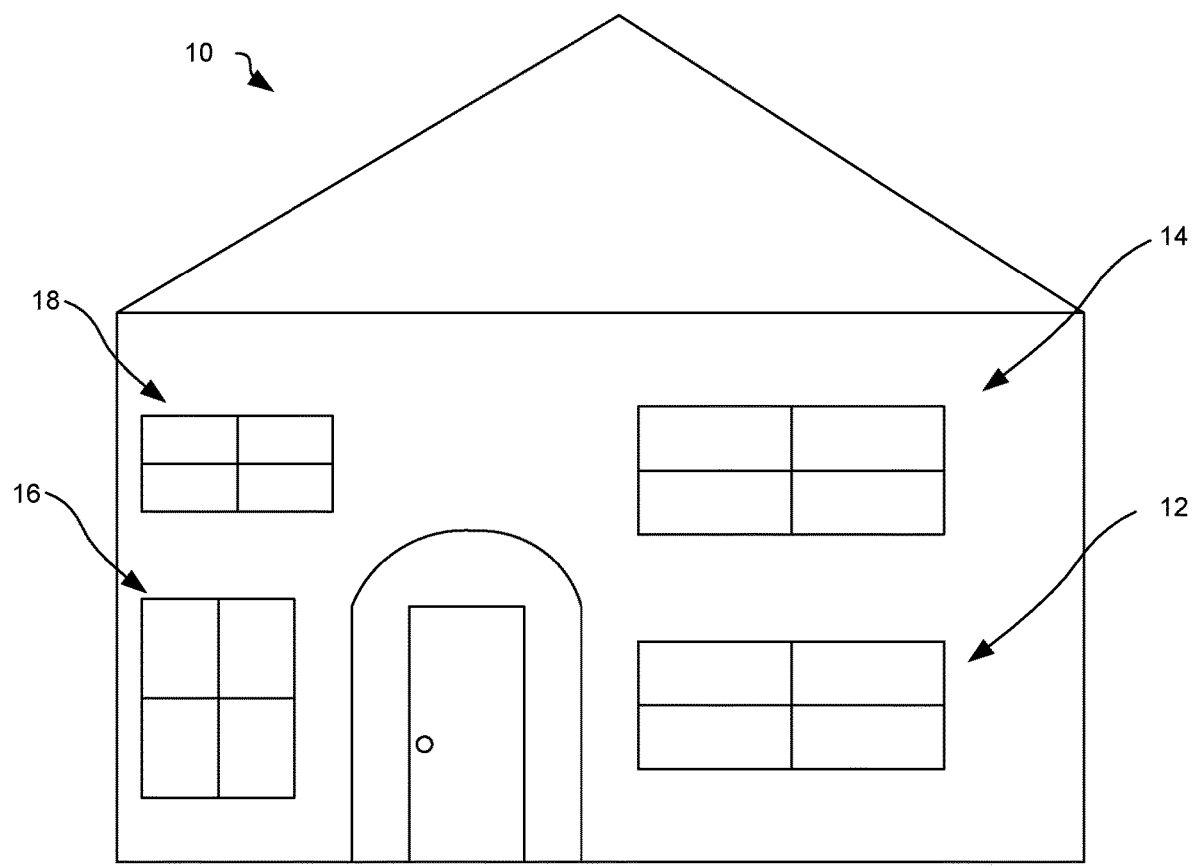
FIG. 1 is a diagram of a structure whose temperature is monitored and controlled by a self-learning temperature monitor and control system shown in FIG. 2.

FIG. 1 is a diagram of a structure 10 whose temperature is monitored and controlled by a self-learning temperature monitor and control system discussed further below. The illustrated structure 10 is a free-standing single-family dwelling. In embodiments, the structure 10 may be a duplex, an apartment within an apartment building, a commercial structure such as an office, a warehouse, a retail store, or a structure or enclosure that is a combination of the above. The structure 10 has a plurality of areas, such as a first room 12, a second room 14, a third room 16, and a fourth room 18. For the purposes of illustration, assume that the first room 12 is a first bedroom, the second room 14 is a second bedroom, the third room 16 is a living room, and the fourth room 18 is a game room. Assume further that the structure 10 is inhabited by a user 110 (FIG. 2) who primarily spends the evenings in the living room 16, primarily spends the nights in the first bedroom 12, and only sporadically uses the second bedroom 14 and the game room 18.

Figure 2:
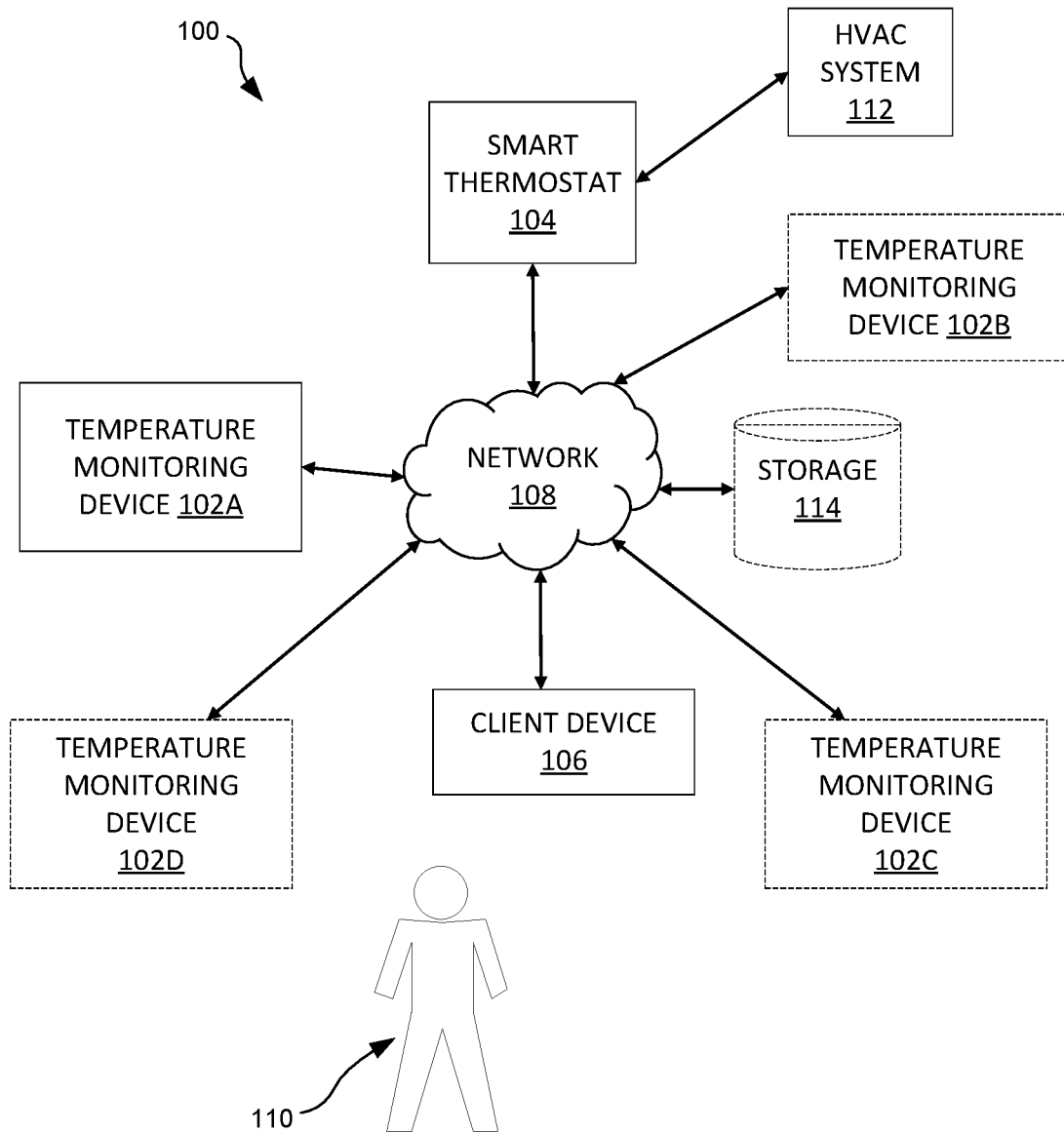
FIG. 2 is a schematic diagram of the self-learning temperature monitor and control system usable to monitor and control the temperature of the structure of FIG. 1, in an embodiment.

FIG. 2 shows an example self-learning temperature monitor and control system 100 that may be used to monitor and intelligently control the temperature within the structure 10. The system 100 may comprise a temperature monitoring device 102A, a smart thermostat 104, and a client device 106. Each of the temperature monitoring device 102A, the smart thermostat 104, and the client device 106 may be communicatively coupled to a network 108. As discussed herein, the smart thermostat 104 may, in embodiments, regulate a HVAC system 112 to control the temperature within the structure 10 in view of a temperature sensed by the temperature monitoring device 102A and reported to the smart thermostat 104 over the network 108.

In embodiments, the self-learning temperature monitor and control system 100 may optionally include additional temperature monitoring devices. For example, and as shown in FIG. 2, the system 100 may comprise a temperature monitoring device 102B, a temperature monitoring device 102C, and a temperature monitoring device 102D. The artisan will readily understand from the disclosure herein that the system 100 may likewise include any number of temperature monitoring devices, each of which may be configured to sense a temperature of an area in which they are located and report same over the network 108 to the smart thermostat 104. For illustrative purposes, assume that the first temperature monitoring device 102A, the second temperature monitoring device 102B, the third temperature monitoring device 102C, and the fourth temperature monitoring device 102D are located in the first bedroom 12, the second bedroom 14, the living room 16, and the game room 18, respectively. Of course, these temperature monitoring devices 102A, 102B, 102C, and 102D may also be located elsewhere in the structure 10. The HVAC system 112 may be located in one of the rooms 12, 14, 16, or 18, or in another area (e.g., in a utility room) within the structure 10. Assume that the smart thermostat 104 usable to regulate the HVAC system 112 is located in the second bedroom 14.

Forced air HVAC systems are the most common heating and cooling systems in use in North America today. In the prior art, it is generally impossible to use a forced air HVAC system to correctly balance the temperature of the various areas of a structure. For example, in the prior art, if the thermostat is located in the second bedroom 14 of the structure 10, the HVAC system 112 is regulated based on the difference between a user-defined temperature setting and the temperature of the second bedroom 14 as sensed by the thermostat, without regard to the temperature in the other rooms. If the thermostat is situated proximate a second bedroom window that receives direct sunlight, for example, the thermostat may cause the HVAC system 112 to deactivate the heating system or activate the cooling system even where the first bedroom 12 (or another area) occupied by the user 110 is frigid. In the same vein, if the thermostat is located in an area in the second bedroom 14 that is relatively cold, the thermostat may cause the HVAC system 112 to deactivate the cooling system or activate the heating system even if the first bedroom 12 (or another area) occupied by the user 110 is uncomfortably warm. The user 110 may thus be left to guess the temperature setting at which the thermostat in the second bedroom 14 is to be set to maintain the desired temperature in the first bedroom 12 (or another area occupied by the user 110). Such, of course, is undesirable. The problem is only exacerbated by factors such as changing ambient temperatures, leaky ductwork, poor insulation, etc., which may require that a different temperature be set at the thermostat in the second bedroom 14 at various points during the day to maintain the same temperature in the first bedroom 12 (or another area occupied by the user 110) throughout the course of the day. In embodiments, the system 100 may serve to remedy these problems by allowing the user 110 to cause the smart thermostat 104 to control the HVAC system 112 based on the temperature sensed by a temperature monitoring device (e.g., temperature monitoring device 102A) located in an area other than the area in which the smart thermostat 104 is located. For example, the user 110 may use the system 100 to cause the HVAC system 112 to be regulated in view of the temperature of the area in which the user 110 is present. As discussed herein, the system 100 may in embodiments be a self-learning system that evaluates previously collected temperature data to improve subsequent temperature regulation in the structure 10.

Figure 3:
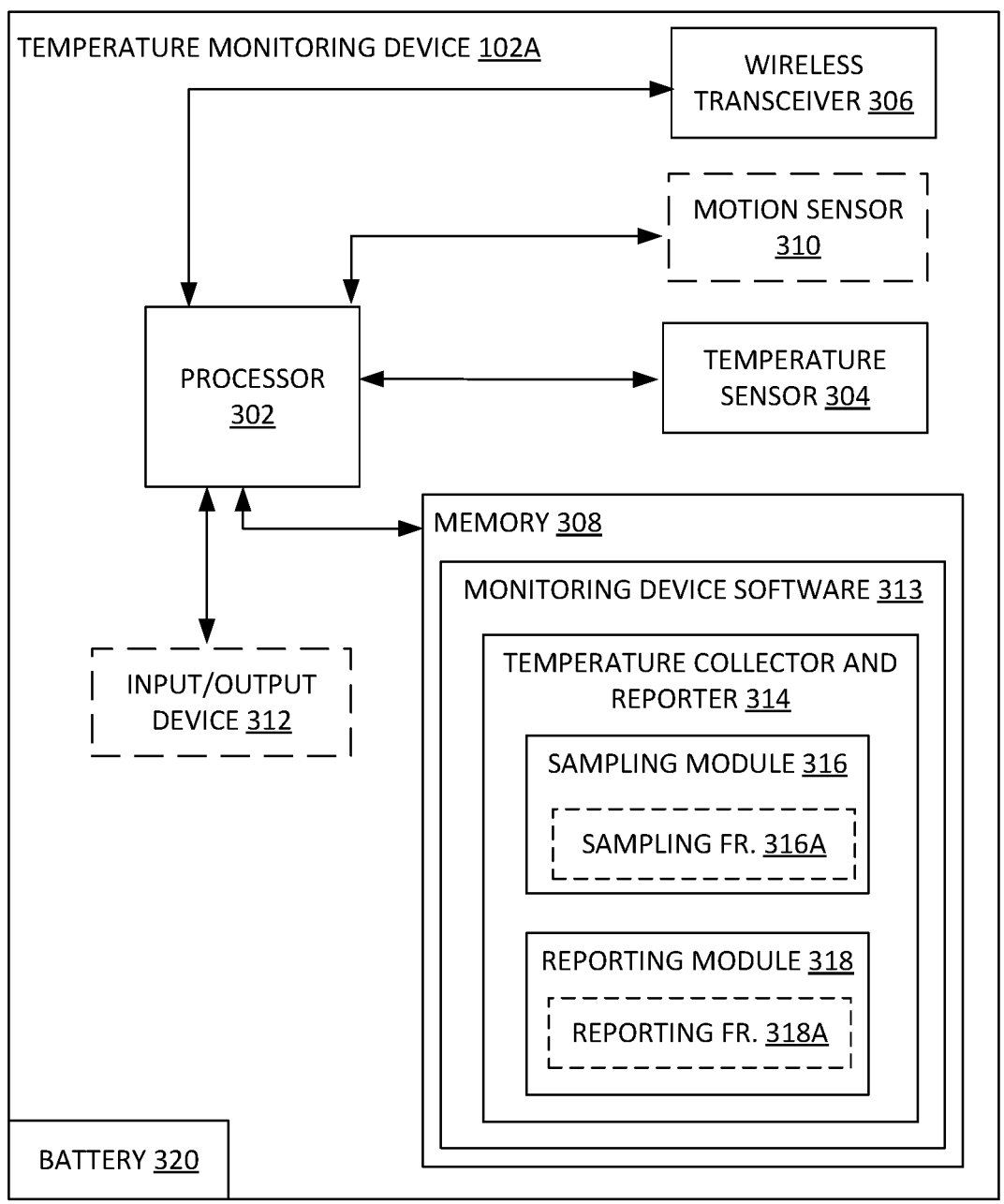
FIG. 3 is a schematic diagram of an example wireless temperature monitoring device of the self-learning temperature monitor and control system of FIG. 2.

Focus is directed to FIG. 3 which shows the temperature monitoring device 102A, in an embodiment. The other temperature monitoring devices 102B, 102C, and 102D may be generally identical to the temperature monitoring device 102A, except as specifically noted and/or shown, or would be inherent.

The temperature monitoring device 102A may be portable, and as discussed herein, may be battery operated. Alternately or additionally, the temperature monitoring device 102A may be configured to be plugged into a power outlet (e.g., a 110V/220V outlet). The temperature monitoring device 102A may include a processor 302 in communication with a temperature sensor 304, a wireless transceiver 306, and a memory 308. In embodiments, the temperature monitoring device 102A may optionally include a motion sensor 310, other sensor(s) 310A, and an input/output device 312. The motion sensor 310, the other sensor(s) 310A, and the input/output device 312, where included, may also be in communication with the processor 302.

The processor 302 may comprise any suitable processor or processors, such as a digital microprocessor, a supplementary co-processor, a math-coprocessor, etc. In embodiments, part or all of memory 308 may be integrated into processor 302. In some embodiments, the processor 302 may be configured through particularly configured hardware, such as an application specific integrated circuit (ASIC), field-programmable gate array (FPGA), etc., and/or through execution of software to perform functions in accordance with the disclosure herein.

The temperature sensor 304 may be configured to sense the temperature of an area within which the temperature monitoring device 102A is located. The temperature sensor 304 may include any suitable contact or non-contact temperature sensor, such as a bimetallic temperature sensor, a resistive temperature detector, a thermocouple, a thermistor, a thermometer, etc. The wireless transceiver 306 may be configured to wirelessly exchange information with other components of the system 100 over the network 108 (FIG. 2). In embodiments, the wireless transceiver 306 may instead be a transmitter configured to wirelessly convey data over the network 108. The network 108 may be any suitable wireless network (or a network that has both wired and wireless components), e.g., a Wi-Fi network, a public switched telephone network, the Internet, a local intranet, a PAN (Personal Area Network), a LAN (Local Area Network), a WAN (Wide Area Network), a MAN (Metropolitan Area Network), a virtual private network (VPN), a storage area network (SAN), a Z-wave network, a BLUETOOTH network, and/or a combination thereof.

Memory 308 represents one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The memory 308 may include monitoring device software 313, which may be stored in a transitory and/or a non-transitory portion of the memory 308. Monitoring device software 313 includes machine readable instructions that are executed by processor 302 to perform the functionality of the temperature monitoring device 102A as described herein.

In an embodiment, the monitoring device software 313 may include a temperature collector and reporter 314. The temperature collector and reporter 314 may comprise a sampling module 316 and a reporting module 318. The sampling module 316 may be configured to periodically sample the temperature sensed by the temperature sensor 304. The reporting module 318 may be configured to report the sensed temperature over the network 108 to the smart thermostat 104. Some or all communications transmitted by the monitoring device 102A may include a unique identifier identifying the particular device (e.g., device 102A in this example) from which the communication is sent over the network 108. In embodiments, the device 102A may further have associated therewith a unique code (e.g., unique machine readable indicia may be situated on the housing of the device 102A) to allow the user 110 to readily differentiate that device 102A from other devices 102B-102D.

The sampling module 316 may have a sampling frequency 316A, i.e., a frequency at which the sampling module 316 samples the temperature sensed by the temperature sensor 304. The reporting module 318 may have a reporting frequency 318A, i.e., a frequency at which the reporting module 318 reports the sampled temperature(s) over the network 108 to the smart thermostat 104. In embodiments, the sampling frequency 316A may be greater than the reporting frequency 318A. For example, in an embodiment, the sampling module 316 may sample the temperature sensed by the temperature sensor 304 once every minute and the reporting module 318 may report the sampled temperatures to the smart thermostat 104 once every five minutes (i.e., the reporting module 318 may transmit a data stream every five minutes that includes the five temperature readings sampled by the sampling module 316 in the last five minutes). Sampling the temperature at a higher sampling frequency 316A and reporting the temperature at a lower reporting frequency 318A may conserve battery life (as compared to both sampling and reporting the temperature at the same higher sampling frequency 316A). Furthermore, sampling the temperature at a higher sampling frequency 316A and reporting the temperature at a lower reporting frequency 318A may allow for data to be collected with high granularity (as compared to both sampling and reporting the temperature at the same lower reporting frequency 318A). The artisan will understand that the sampling frequency 316A of the sampling module 316 may be any frequency that is greater than the reporting frequency 318A of the reporting module 318. In other embodiments, the sampling frequency 316A may be equal to the reporting frequency 318A.

In some embodiments, the sampling frequency 316A and/or the reporting frequency 318A may be respectively set by the sampling module 316 and the reporting module 318 dynamically. For example, the sampling module 316 and/or the reporting module 318 may adaptively change the sampling frequency 316A and/or the reporting frequency 318A, respectively, based on the operation of the HVAC system 112. In embodiments, the sampling frequency 316A and/or the reporting frequency 318A may be increased when the HVAC system 112 is actively heating or cooling the structure 10, and may be decreased when the HVAC system 112 is in its steady state (i.e., is not heating or cooling the structure 10). Setting the sampling frequency 316A and/or the reporting frequency 318A adaptively in this fashion may allow the HVAC system 112 to be regulated with greater precision without putting an undue strain on the battery 300 of the device 102A.

The motion sensor 310, where included, may be a passive infrared motion detector, a microwave sensor, an ultrasonic sensor, an area reflective type sensor, a vibration detector, etc. As discussed herein, the motion sensor 310 may in embodiments be used to determine the area in which the user 110 is currently present so that the HVAC system 112 may be controlled using the temperature monitoring device 102A-102D closest to that area. The other sensor(s) 310A, where provided, may include a smoke detector, a security system sensor, an air pollution sensor, a gas detector, a sunlight detector, a humistor, etc. In embodiments, one or more of the other sensors 310A may be included in a housing of the temperature monitoring device 102A (discussed below). Alternately or additionally, one or more other sensors 310A may be provided elsewhere. For example, one or more of the other sensors 310A may be mounted in a room in the structure 102. Or, for instance, one or more of the other sensors 310A may be part of another system (such as a fire detection and alarm system) in wireless communication with the temperature monitoring device 102A. The other sensors 310A may be battery powered and/or may be powered using other means (e.g., via 110V/120V power outlets).

In embodiments, the user 110 may be able to interact with (e.g., direct the operation of) the system 100 using the client device 106 discussed further below, such as via a temperature monitor and control application 510 (FIG. 5) downloaded and stored thereon. In some embodiments, the temperature monitoring device 102A may include the input/output device 312 and the user 110 may alternately or additionally use same to interact with the system 100. The input/output device 312 may comprise any suitable input and/or output device, such as a display, a speaker, a microphone, a touch screen, a button, a knob, a switch, etc.

While not expressly shown in FIG. 3, the temperature monitoring device 102A may further have a housing, which may, in embodiments, be configured to be replaceable. For example, in an embodiment, the user 110 may replace the housing of the temperature monitoring device 102A with a differently colored (or shaped) housing to suit the décor in the first bedroom 12. In embodiments, the temperature monitoring device housing may be configured to be permanently or removably secured (e.g., via a fastener, an adhesive, a latch, and/or other means (such as magnetically)) to a desired location within the first room 12. In embodiments, the temperature monitoring device 102A may have a relatively small form factor (e.g., on the order of an inch, a few inches, etc.) so as to ensure that the temperature monitoring device 102 does not substantially detract from the appearance of the room in which it is situated. In some embodiments, one or more temperature monitoring devices 102A-102D may be part of another device (e.g., may be housed in the housing of another device), such as a security system component, a smart speaker, a smart appliance, a smoke sensor, etc.

The temperature monitoring device 102A may be powered by a battery 320, such as a lithium battery, a lithium-ion battery, a nickel-cadmium battery, etc. The battery 320 may, in embodiments, be rechargeable (e.g., the user 110 may charge the battery wirelessly; alternatively, or in addition, the housing of the device 102A may have a port for allowing the user 110 to charge the battery 320 via a USB or other wired connection). In some embodiments, the battery 320 may be disposable (e.g., the housing of the device 102A may have an openable section for allowing the user 110 to replace the battery 320). In some embodiments, the battery 320 may comprise two or more batteries of the same or different type (e.g., a portable battery, a rechargeable battery, a disposable battery, etc.). In embodiments, the input/output device 312 may indicate the battery level of the device 102A to allow the user 110 to replace same when required.

Figure 4:
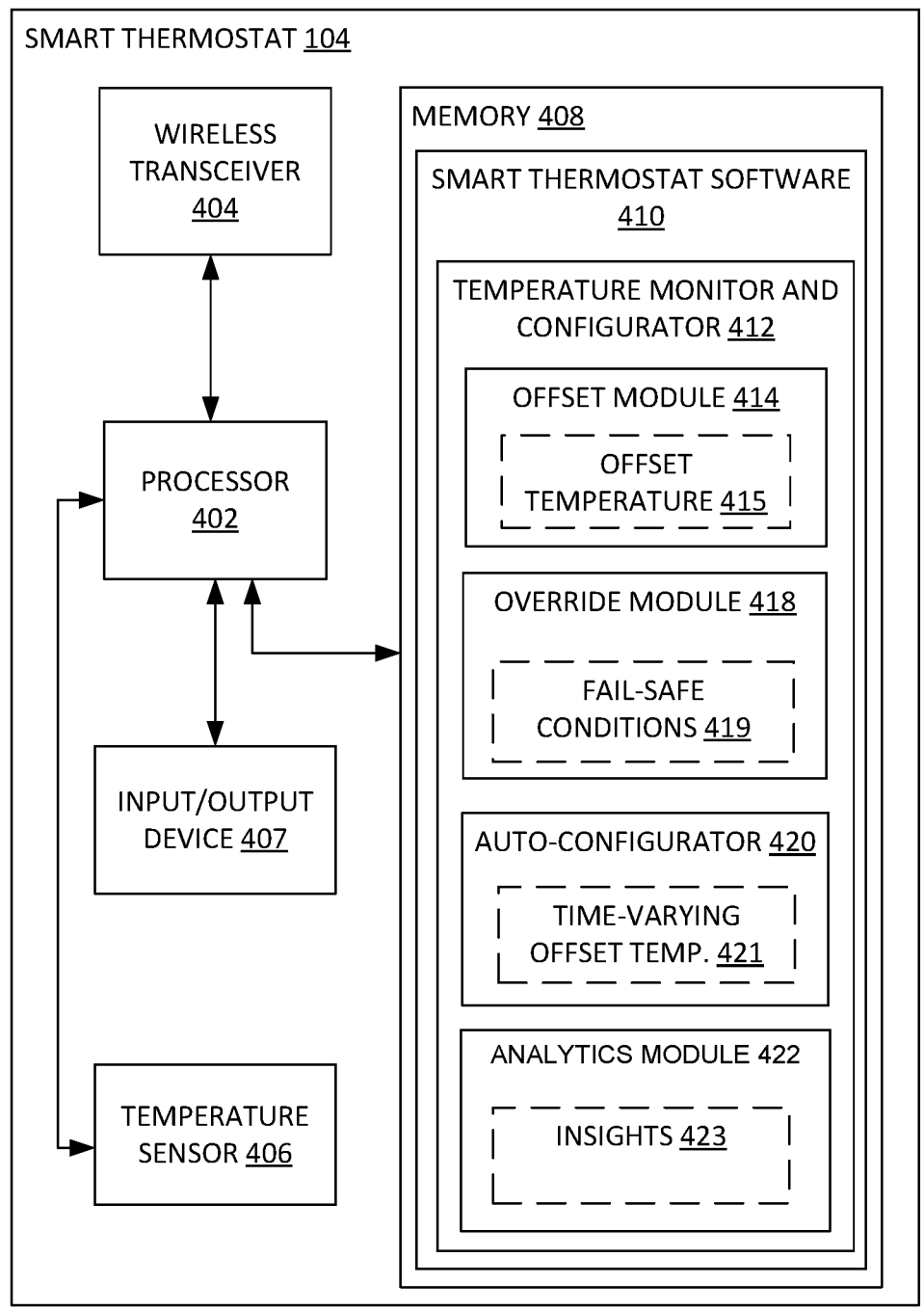
FIG. 4 is a schematic diagram of an example smart thermostat of the self-learning temperature monitor and control system of FIG. 2.

Focus is directed now to FIG. 4, which shows the smart thermostat 104, in an embodiment. The smart thermostat 104 may comprise a processor 402 in data communication with a wireless transceiver 404, a temperature sensor 406, an input/output device 407, and a memory 408. The processor 302 represents a digital processor and may include any suitable processor or processors. In embodiments, part or all of memory 408 may be integrated into processor 402. In some embodiments, the processor 402 may be configured through particularly configured hardware, such as an application specific integrated circuit (ASIC), field-programmable gate array (FPGA), etc., and/or through execution of software to perform functions of the smart thermostat 104 in accordance with the disclosure herein.

The wireless transceiver 404 may be configured to wirelessly transmit and/or receive information (e.g., receive temperature information from the temperature monitoring devices 102A-102D, transmit and receive information to and from the client device 106, etc.) over the network 108. The temperature sensor 406 may be a temperature sensor of the type discussed above for the temperature sensor 304. The temperature sensor 304 employed in a temperature monitoring device (e.g., device 102A) may be the same as or different from the temperature sensor 406 employed in the smart thermostat 104. The input/output device 407 may comprise any suitable input and/or output device, such as a keypad, a display, a speaker, a microphone, a touch screen, a button, a switch, etc. The input/output device 407 may allow the user 110 to functionally interact with the smart thermostat 104 to control the operation of the system 100. In embodiments, and as discussed herein, the user 110 may alternately or additionally interact with the smart thermostat 104 via the temperature monitor and control application 510 stored on client device 106.

Memory 408 represents one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The memory 408 may include smart thermostat software 410, which may be stored in a transitory and/or a non-transitory portion of the memory 408. Software 410 includes machine readable instructions that are executed by processor 402 to perform the functionality of the smart thermostat 104 as discussed herein. In embodiments, a temperature monitoring device (e.g., device 102A) may include some or all of the functionality of the smart thermostat 104 (e.g., include all or part of the monitoring device software 313 and the smart thermostat software 410).

Storage 114 (FIG. 2), where provided, may supplement or replace the memory 408 in whole or in part. For example, in embodiments, all or part of the software 410 and/or the software 313 may be stored in the storage 114. Or, for instance, the temperature data collected by the thermostat 104 (as discussed below) may be stored in whole or in part in the storage 114. The storage 114 may be any storage device accessible by the smart thermostat 104 (e.g., over the network 108). For example, the storage 114 may be a secure or other cloud storage device, a USB memory stick, an SD or micro SD card, etc. In embodiments, where the temperature reading of a particular temperature monitoring device (e.g., device 102A) is queried by the user as discussed herein, the response to the query may be generated by accessing data collected by the temperature monitoring device 102A and stored in the storage 114 (e.g., the cloud). In embodiments, and based on the size of the storage 114, the data in the storage 114 may be periodically (e.g., once every six months, once every year) deleted and/or transferred to another storage in communication with the storage 114.

Software 410 may comprise a temperature monitor and configurator 412. In an embodiment, the temperature monitor and configurator 412 may include an offset module 414, an override module 418, an auto-configurator 420, and an analytics module 422.

The offset module 414 may be configured to calculate an offset temperature 415 and may further be configured to cause the thermostat 104 to operate at this offset 415. The override module 418 may be configured to override a user input based on a determination that a fail-safe condition (or an "override condition") 419 is met. The auto-configurator 420 may be adapted to calculate a time-varying offset temperature 421 and may further be adapted to cause the thermostat 104 to operate at this time-varying offset 421. The analytics module 422 may be configured to generate pertinent insights 423 regarding the temperatures sensed by the various monitoring device temperature sensors 304 and the thermostat temperature sensor 406 for user consumption.

In more detail, the offset module 414 may be configured to determine the offset temperature 415 based on an evaluation of the temperature reading of the thermostat temperature 406 relative to the temperature reading(s) of the temperature sensor(s) 304 of one or more temperature monitoring devices 102A-102D (e.g., of one or more temperature monitoring devices 102A-102D selected by the user 110). For example, in an embodiment, the offset module 414 may be configured to determine the offset temperature 415 by computing the difference between the temperature reading of the thermostat temperature sensor 406 and the temperature reading(s) of the temperature sensor(s) 304 of one or more temperature monitoring devices 102A-102D. For instance, if the temperature sensor 406 of the thermostat 104 indicates that the temperature is 60° F. and the temperature sensor 304 of the temperature monitoring device (e.g., device 102A) selected by the user 110 indicates that the temperature is 70° F., the offset module 414 may determine that the offset temperature 415 is 10° F. and cause the smart thermostat 104 to operate at this 10° F. offset. Put differently, if the user 110 selects the first temperature monitoring device 102A in this example, the offset module 414 may effectively cause the smart thermostat 104 to adopt the temperature reading of the temperature sensor 304 of the first temperature monitoring device 102A as its own so that the HVAC system 112 may be regulated based on the temperature sensed by the temperature sensor 304 of the first temperature monitoring device 102A (as opposed to the temperature sensed by the temperature sensor 406 of the thermostat 104). The offset module 414 may likewise allow the user 110 to select any temperature monitoring device 102B-102D to cause the smart thermostat 104 to regulate the temperature within the structure 10 based on the temperature sensed by the temperature sensor 304 of that device. The user 110 may thus select any of the temperature monitoring devices 102A-102D (e.g., the device 102A-102D closest to the user 110) to cause the HVAC system 112 to regulate the temperature of the structure 10 based on the temperature of this area (as opposed to regulating the HVAC system 112 based on the temperature of the area in which the thermostat 104 is located). In some embodiments, the offset module 414 may determine the offset temperature 415 by determining a difference between an average temperature reading of the selected temperature monitoring device 102A-102D (e.g., the average temperature reading of the selected device 102A-102D over the last five minutes, the last hour, the last day, etc.) and the temperature reading of the smart thermostat temperature sensor 406. Alternately or additionally, the offset module 414 may determine a median of the temperature reading(s) of the selected device(s) 102A-102D and compare this median to the smart thermostat temperature sensor 406 to determine the offset temperature 415.

The user 110 may select a temperature monitoring device 102A-102D in one or more of a number of ways. In embodiments, and as discussed herein, the user 110 may use the client device 106 (e.g., the temperature monitor and control application 510 stored thereon) to select one of the temperature monitoring devices 102A-102D. Alternately or in addition, the user 110 may use the input/output device 312 of the respective temperature monitoring device 102A-102D to select same (e.g., the user 110 may depress a button on one of the temperature monitoring devices 102A-102D to select that temperature monitoring device). In embodiments, the user 110 may be able to alternately or additionally select (and/or otherwise interact with) a temperature monitoring device 102A-102D via voice command. In other embodiments still, the user 110 may alternately or additionally use the input/output device 407 of the smart thermostat 104 to select any of the temperature monitoring devices 102A-102D. The user 110 may also choose the thermostat 104 instead of a temperature monitoring device 102A-102D to cause the thermostat 104 to operate at a 0° F. offset (e.g., when the user 110 is in the second bedroom 14 where the smart thermostat 104 is located, the user 110 may select the thermostat 104 to cause the thermostat 104 to operate the HVAC system 112 based on the temperature readings obtained by its own temperature sensor 406).

The user 110 may, in embodiments, employ the offset module 414 to determine the offset temperature 415 by averaging the temperature sensor readings of two or more temperature monitoring devices 102A-102D and comparing this average temperature to the temperature reading indicated by the smart thermostat temperature sensor 406. For example, if the user 110 is going back and forth between the first bedroom 12 and the living room 16, the user may use the offset module 414 to effectively cause the smart thermostat 104 to adopt the average of the readings obtained by the temperature monitoring devices 102A and 102C as its own.

In some embodiments, and particularly where the temperature monitoring devices 102A-102D include the motion sensor 310, the offset module 414 may first ascertain which temperature monitoring device 102A-102D is currently closest to the user 110, and then determine the offset temperature 415 by computing the difference between the temperature sensor reading of this device 102A-102D and the temperature sensor reading of the thermostat temperature sensor 406. Such functionality, where provided, may render it unnecessary for the user 110 to manually select the temperature monitoring device 102A-102D closest to the user 110. Where the structure (e.g., dwelling) 10 includes multiple residents, the offset module 414 may select the temperature monitoring device 102A-102D whose motion sensor 310 detects the greatest number of movements. In some embodiments, the offset module 414 may compute a blended offset temperature by attributing different weights to the temperatures sensed by the different temperature monitoring devices 102A-102D. For example, in an embodiment, the offset module 414 may determine a blended average of the temperatures of the temperature monitoring devices 102A-102D by attributing a greater weight to a temperature monitoring device 102A-102D located in high traffic areas and attributing a lower weight to the temperature monitoring devices 102A-102D in lower traffic areas, and then compute the blended offset by evaluating the difference between the thermostat temperature and the blended average. In embodiments, instead of computing an offset as described herein, the smart thermostat 104 may simply regulate the HVAC system 112 based on the temperature readings reported to the smart thermostat 104 by one or more temperature monitoring devices 102A-102D (e.g., one or more user-selected temperature monitoring device(s)).

The override module 418, also referred to herein as a "fail-safe module" 418, may be configured to determine whether the temperature setting set by the user 110 for the HVAC system 112 is (or becomes) atypical. If the override module 418 determines that the temperature setting set by the user 110 is atypical (e.g., where the temperature sensed by the temperature monitoring device 102A-102D selected by the user 110 would cause the cooling system to activate but the temperature sensor 406 of the thermostat 104 indicates that it is uncomfortably cold), the override module 418 may override the user input to cause the HVAC system 112 to operate in view of the temperature sensed by the temperature sensor 406 of the thermostat 104 itself.

A user-selected temperature setting may for example be atypical where the portable temperature monitoring device 102A-102D selected by the user 110 is moved from one location to another (e.g., where the selected device 102A falls from a wall of the first room 12 and lands on a cold tile floor, where the device 102A is inadvertently placed next to a window, where a child places the device 102A in a refrigerator, etc.). In such case, the override module 418 may override the user input to cause the thermostat 104 to revert to regulating the HVAC system 112 in view of the temperature readings of its own temperature sensor 406 (or another temperature sensing device 102A-102D, e.g., a secondary or backup temperature monitoring device 102A-102D selected by the user 110).

In more detail, the override module 418 may override a user input if one (or more) fail-safe conditions 419 is/are met. The fail-safe conditions 419 may be stored in a transitory and/or a non-transitory portion of the memory 408. In embodiments, one or more fail-safe conditions 419 may take into account the heating and cooling set points of the smart thermostat 104. The artisan understands that the smart thermostat 104, like other conventional thermostats, may have a heating set point and a cooling set point (e.g., the heating set point may be between 60° F. and 75° F. and the cooling set point may be between 70° F. and 85° F.). The fail-safe conditions 419 in one embodiment may include the four fail-safe conditions set forth in table 1 below; as noted, the override module 418 may override a user input and the thermostat 104 may revert to regulating the HVAC system 112 based on the temperature readings of its own temperature sensor 406 if any of these conditions are met. Those skilled in the art will appreciate that the fail-safe conditions 419 set forth herein are merely exemplary and are not intended to be independently limiting.

TABLE 1

| No. | Fail-safe conditions 419 | Result |
| --- | --- | --- |
| 1 | (HVAC heating is off) AND ((temperature sensed by thermostat temperature sensor 406 - heating set point) <−9° F.) | Activate HVAC heating |
| 2 | (HVAC heating is on) AND ((temperature sensed by thermostat temperature sensor 406 - heating set point) >9° F.) | Deactivate HVAC heating |
| 3 | (HVAC cooling is on) AND ((temperature sensed by thermostat temperature sensor 406 - cooling set point) <−9° F.) | Deactivate HVAC cooling |
| 4 | (HVAC cooling is off) AND ((temperature sensed by thermostat temperature sensor 406 - cooling set point) >9° F.) | Activate HVAC cooling |

To illustrate, consider the first fail-safe condition 419. Assume that: (a) the ambient temperature is 40° F.; (b) the temperature sensor 406 of the smart thermostat 104 indicates that the temperature in the second bedroom 14 is 55° F.; (c) the user 110 selects the first temperature monitoring device 102A for the regulation of the HVAC system 112; (d) the first temperature monitoring device 102A initially indicates that the temperature is 50° F.; and (e) the first temperature monitoring device 102A subsequently indicates that the temperature is 90° F. because the first temperature monitoring device 102A is inadvertently placed next to a window in the first bedroom 12 that is receiving direct sunlight. If the override module 418 were not provided, the HVAC heating would be (or remain) deactivated because the temperature sensor 304 of the selected temperature monitoring device 102A indicates that the temperature is above the heating set point (i.e., is 90° F.). Such may cause the average temperature in the structure 10 to fall to uncomfortably low levels, which the user 110 may find undesirable. To remedy such problems, the override module 418 may periodically check whether any of the fail-safe conditions 419 are met, and in this example, ascertain that the first fail-safe condition 419 is satisfied (i.e., the HVAC heating is off and the difference between the temperature sensed by the thermostat temperature sensor 406 and the heating set point is less than −9° F.). This determination may in-turn cause the override module 418 to ascertain that the temperature of the area in which the selected temperature monitoring device 102A is situated is unusually high relative to the temperature sensed by the temperature sensor 406 of the thermostat 104. The override module 418 may resultantly override the user input (i.e., deselect the temperature monitoring device 102A selected by the user 110) and revert to regulating the HVAC system 112 in view of the temperature sensed by the temperature sensor 406 of the thermostat 104. As a result (see Table 1), the HVAC system 112 heat may be activated despite the fact that the temperature sensor 304 of the selected device 102A indicates that it is uncomfortably hot (e.g., is 80° F.). The other three fail-safe conditions 419 in Table 1 may likewise change the state of the HVAC 112 system and ensure that an atypical user input (e.g., an atypical user input that results from the movement or abnormal placement of the selected temperature monitoring device 102A-102D) is overridden.

In some embodiments, additional fail-safe conditions 419 may be provided. For example, in an embodiment, the selected temperature monitoring device (e.g., device 102A) may be deselected (i.e., the thermostat 104 may revert back to using its own temperature sensor 406 to control operation of the HVAC system 112) if the selected temperature monitoring device 102A is disconnected from the network 108 for a time period (e.g., ten minutes, fifteen minutes, or a different time period). Alternately or additionally, the selected temperature monitoring device (e.g., device 102A) may be deselected where the selected temperature monitoring device informs the thermostat 104 that its battery 320 is failing. In some embodiments, where one or more fail-safe condition 419 is met, an alert may be communicated to the user 110 instructing the user 110 to call a HVAC technician.

In embodiments, the user 110 may be able to use the client device 106 (e.g., an application stored thereon) and/or the input/output device 407 to activate the auto-configurator 420. The auto-configurator 420 may be configured to aggregate historical temperature data obtained by the temperature monitoring devices 102A-102D and the thermostat 104 to proactively control the operation of the HVAC system 112. The artisan understands that the HVAC system 112 cannot heat or cool an area within the structure 10 in isolation (e.g., cannot heat the first bedroom 12 without also heating the second bedroom 14 to some degree). The auto-configurator 420 may allow historical temperature data aggregated from multiple temperature monitoring devices (e.g., devices 102A-102D) and the thermostat 104 to be evaluated so that all rooms 12, 14, 16, and 18 may be maintained at a temperature close to a desirable (e.g., a user-defined) temperature.

In more detail, and as noted above, due to factors such as changing weather, arrangement and constitution of HVAC ducts, and the like, the difference between the temperature sensed by a temperature monitoring device (e.g., device 102A, device 102B, etc.) and the temperature sensed by the thermostat 104 may change during the course of the day. For example, the difference between the temperature sensed by the device 102A and the thermostat 104 may be 6° F. at 10 am, 10° F. at 6 pm, 7° F. at 10 pm, and so on. The auto-configurator 420 may be configured to aggregate temperature information from a plurality of temperature monitoring devices (e.g., devices 102A-102D) and the thermostat 104 to determine the time-varying offset 421 to apply to the thermostat 104 at various points during the day to cause each of the rooms 12, 14, 16, and 18 to be maintained at a temperature close to a desirable (e.g., a user-defined) temperature.

To illustrate, an example process to calculate the time-varying offset temperature 421 is set forth below. To compute the time-varying offset 421, the auto-configurator 420 may compile temperature data obtained from the temperature monitoring device 102A-102D and the thermostat 104 within the last two weeks (or a different length of time). The auto-configurator 420 may then divide the data from each day of the last two weeks into a plurality of equal time segments (e.g., a segment from midnight to 6 am, a segment from 6 am to noon, a segment from noon to 6 pm, and a segment from 6 pm to midnight). Next, the auto-configurator 420 may calculate the mean of the temperatures of the monitoring device 102A-102D and the thermostat 104 for each minute within each segment. The auto-configurator 420 may then compute the deviation of this mean from the temperature of the thermostat 104 for each minute (i.e., the auto-configurator 420 may determine for each minute the difference between the temperature indicated by the thermostat 104 and the mean of the temperatures indicated by the thermostat 104 and the devices 102A-102D). Once the deviation of the mean temperature from the thermostat temperature has been computed, the auto-configurator 420 may calculate the average deviation for each time segment. Finally, the auto-configurator 420 may linearly interpolate between the mean deviations of each time segment to generate a time-varying offset temperature 421 for each minute of the day. When the user 110 activates the auto-configurator 420, the auto-configurator 420 may apply this time-varying offset temperature 421 to the thermostat 104 based on the time of day. The auto-configurator 420 may recalculate the time-varying offset temperature 421 for each minute the next day in like fashion by evaluating the temperature data of the last two weeks. In this way, the auto-configurator 420 may take into account historical temperature data to better balance the temperature within the structure 10 in the future.

In some embodiments, the auto-configurator 420 may learn from the temperature settings set by the user 110 in the past to automatically control the temperature of the structure 10 in the future. For example, if the user 110 selects the temperature monitoring device 102C in the living room at 11:00 am every Saturday for a time period (e.g., for a month), in embodiments, the auto-configurator 420 may learn from this user behavior and proactively select the temperature monitoring device 102C at 11:00 am on coming Saturdays. Or, for example, if the user 110 reverts to the thermostat temperature at 10:00 pm each weekday night for a time period, the auto-configurator 420 may learn from this user behavior and automatically revert to the thermostat temperature at this time each weekday night. Of course, the user 110 may be allowed to deactivate all or part of the functionality of the auto-configurator 420 at any time. In some embodiments, the system 100 may include only part of the functionality of the auto-configurator 420 described herein.

The analytics module 422 may be configured to generate temperature insights 423 based on the user's use of the system 100. The insights 423 may be communicated to the user 110 over the temperature monitor and control application 510 on the client device 106. In embodiments, the insights 423 may include numerical data. Alternately or additionally, the insights 423 may in embodiments present information to the user 110 in a more readily digestible format.

For example, in embodiments, the insights 423 may outline the temperature sensed by each temperature monitoring device 102A-102D relative to the thermostat temperature. For instance, the analytics module 422 may compute a two week (or a different) historical average of the temperatures sensed by the temperature monitoring device 102A and the thermostat 104, and then determine a difference between these two historical averages. If the historical average temperature of the device 102A in the last two weeks is greater than the historical average temperature of the thermostat 104 and the difference is greater than 1.5° F. (or a different value), the insights 423 may outline that the temperature monitoring device 102A is "warmer" relative to the thermostat 104. Similarly, if the historical average temperature of the device 102A in the last two weeks is less than the historical average temperature of the thermostat 104 and the difference is less than 1.5° F. (or a different value), the insights 423 may outline that the temperature monitoring device 102A is "colder" relative to the thermostat 104. Such simplified labels (e.g., "warmer", "colder", etc.) may allow the user 110 to more readily determine the temperature of the monitoring device 102A relative to the thermostat 104 over lengths of time (as compared to plotting this data in graphs, providing numerical values for the differences in averages each day, etc.). Similarly, in embodiments, the insights 423 may characterize the monitoring device 102A-102D that has the highest average temperature (in the last two weeks or a different length of time) and the lowest average temperature as the "warmest" and "coldest" device, respectively. The insights 423 may also include a warning to indicate a loss of connectivity of a device 102A-102D, warnings to indicate low battery power levels of a device 102A-102D and/or to indicate the amount of time in which the battery of a device 102A-102D should be changed to ensure continued functionality thereof, a warning to indicate that a device 102A-102D is unresponsive, a warning to indicate that one of the fail-safe conditions 419 is met, etc. The warnings may be an audible warning, a visual warning, and/or a combination thereof, and may be communicated by the thermostat 104 and/or the client device 106 via the temperature monitor and control application 510 stored thereon.

Figure 5:
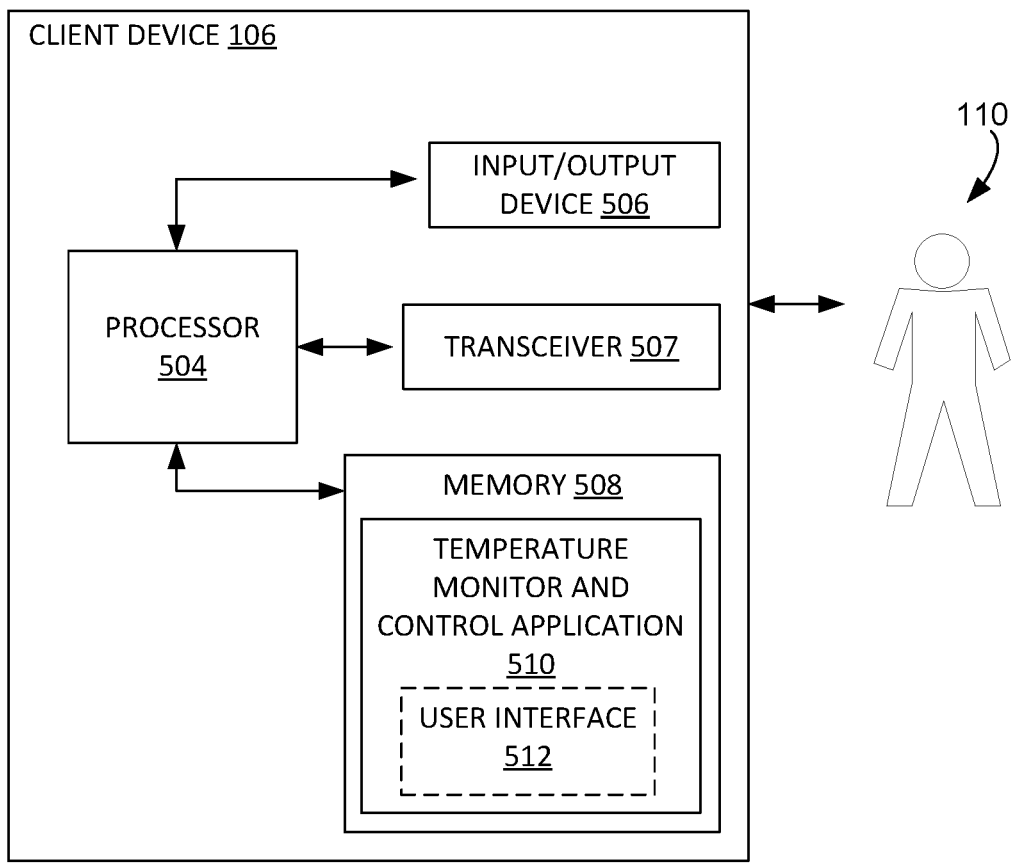
FIG. 5 is a schematic diagram of an example client device of the self-learning temperature monitor and control system of FIG. 2.

FIG. 5 shows the client device 106, in an embodiment. The client device 106 may be configured for use by the user 110. The user 110 may be an owner or operator of the system 100, a resident of (e.g., a tenant in) the structure 10, or any other user.

The client device 106 may be a stationary computing device (e.g., a desktop computer) or a mobile computing device (e.g., a laptop, a tablet, a smartphone, etc.). The client device 106 may comprise a processor 504 in data communication with one or more input/output device(s) 506, a transceiver 507, and a memory 508. The processor 504 may include one or more processors, such as one or more microprocessors, and/or one or more supplementary co-processors, such as math co-processors. The input/output device(s) 506 may comprise any suitable input and/or output device(s), such as a display, a speaker, a microphone, a retinal scanner, a touchscreen, a keyboard, a mouse, etc., for allowing the user 110 to interact with the client device 106. The transceiver 507 may be a wired transceiver and/or a wireless transceiver. The transceiver 507 may allow the client device 106 to send messages to and receive messages from the smart thermostat 104 over the network 108.

The memory 508 may be transitory memory, non-transitory memory, or a combination thereof. The memory 508 may include both volatile memory, such as random access memory (RAM), as well as non-volatile memory, such as read-only memory (ROM), hard drives, flash memory, or any other suitable memory/storage element. The memory 308 may include removable memory elements, such as a CompactFlash card, a MultiMediaCard (MMC), and/or a Secure Digital (SD) card. In certain embodiments, the memory 508 includes a combination of magnetic, optical, and/or semiconductor memory, and may include, for example, RAM, ROM, flash drive, and/or a hard disk or drive.

In embodiments, the memory 508 may include a temperature monitor and control application 510, which the user 110 may download onto the client device memory 508 over the web (e.g., from an "app store") or via other means. The temperature control application 510 may be password protected, encrypted, and/or otherwise secured. The temperature control application 510 may be stored in a transitory and/or a non-transitory portion of the memory 508. The temperature control application 510 may comprise software and/or firmware that contains machine-readable instructions executed by the processor 504 to perform the functionality of the client device 106 as described herein.

The temperature control application 510 may include a user interface 512 usable by the user 110 to interact with the system 100. For example, the user 110 may use the user interface 512 to select a temperature monitoring device(s) 102A-102D so that the HVAC system 112 may be regulated in view of the temperature sensed by the temperature sensor 304 of this selected device(s). Or, for instance, the user 110 may use the user interface 512 to query the temperature reading of a temperature monitoring device 102A-102D, activate the auto-configurator 420, activate the heating or cooling system of the HVAC system 112, check the connectivity of the temperature monitoring devices 102A-102D, review one or more temperature insights 423, etc. In some embodiments, the client device 106 may be omitted from the system 100 and the user 110 may be required to interact with the system 100 via the input/output device 407 of the smart thermostat (and/or the input/output device 312 of the temperature monitoring devices 102A-102D). In other embodiments, the temperature monitor and control application 510 may be configured to allow the user 110 to interact with two or more systems 100 (e.g., the user 110 may use the user interface 512 of the temperature control application 510 to interact with the system 100 in his house and another system 100 at his workplace).

Figure 6:
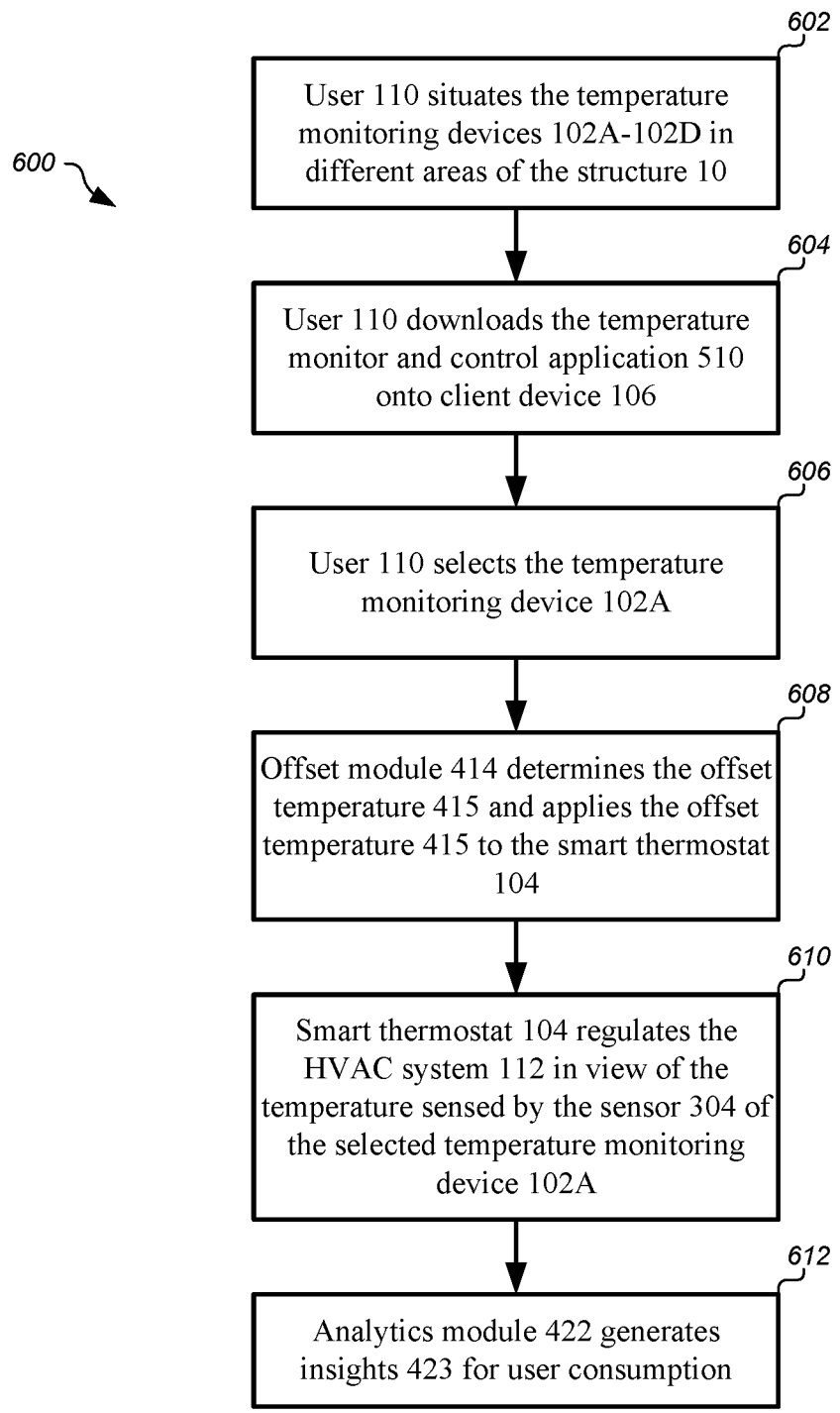
FIG. 6 is a flowchart illustrating a method for using the self-learning temperature monitor and control system of FIG. 2, in an embodiment.

Attention is directed now to FIG. 6, which shows an example method 600 for using the self-learning temperature monitor and control system 100. At step 602, the user 110 may situate the temperature monitoring devices 102A-102D in different areas of the structure 10. For example, the user 110 may situate the first temperature monitoring device 102A, the second temperature monitoring device 102B, the third temperature monitoring device 102C, and the fourth temperature monitoring device 102D in the first bedroom 12, the second bedroom 14, the living room 16, and the game room 18, respectively. At step 604, the user 110 may download the temperature monitor and control application 510 onto the client device memory 508. The artisan will understand that the user 110 may also download the temperature monitor and control application 510 before situating the temperature monitoring devices 102A-102D in different areas of the structure 10 at step 602.

At step 606, the user 110 may select a temperature monitoring device (e.g., the user 110 may select the temperature monitoring device 102A in the first bedroom where the user 110 is currently situated). At step 608, the offset module 414 of the smart thermostat software 410 may determine the offset temperature 415 as discussed above and apply this offset temperature to the smart thermostat 104. At step 610, because of the applied offset temperature 415, the smart thermostat 104 may regulate the HVAC system 112 in view of the temperature sensed by the temperature sensor 304 of the selected temperature monitoring device 102A (as opposed to in view of the temperature sensed by the temperature sensor 406 of the thermostat 104). At step 612, the analytics module 422 may generate a temperature insight 423 for user consumption. For example, the analytics module 422 may identify whether the average temperature of the temperature monitoring device 102A over the last two weeks is more than 1.5° F. greater than (or less than) that the average temperature of the thermostat 104 during this time period. The user 110 may cause the analytics module 422 to generate the insights 423 on command; alternately or additionally, the analytics module 422 may generate the insights and communicate same to the client device 106 and the user 110 may use the user interface 512 to review the insights 423 as desired.

Figure 7:
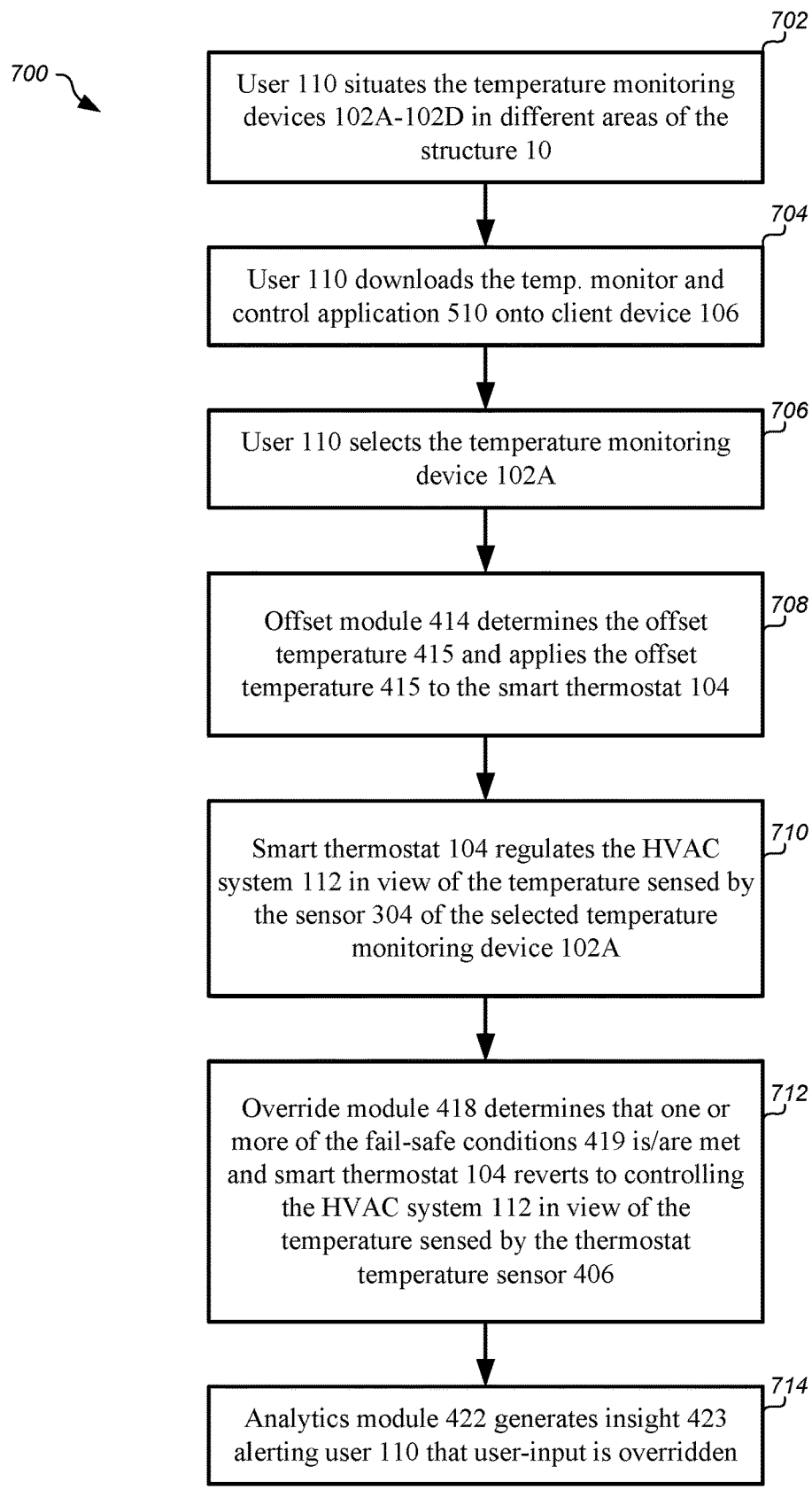
FIG. 7 is a flowchart illustrating another method for using the self-learning temperature monitor and control system of FIG. 2, in an embodiment.

Focus is directed to FIG. 7, which shows another example method 700 for using the self-learning temperature monitor and control system 100. At step 702, the user 110 may situate the temperature monitoring devices 102A-102D in different areas of the structure 10. For example, and as discussed above for step 602 of the method 600, the user 110 may situate the first temperature monitoring device 102A, the second temperature monitoring device 102B, the third temperature monitoring device 102C, and the fourth temperature monitoring device 102D in the first bedroom 12, the second bedroom 14, the living room 16, and the game room 18, respectively. At step 704, the user 110 may download the temperature monitor and control application 510 onto the client device memory 508. At step 706, the user 110 may select a temperature monitoring device (e.g., the user 110 may select the temperature monitoring device 102A in the first bedroom). At step 708, the offset module 414 of the smart thermostat software 410 may determine the offset temperature 415 as discussed above and apply this offset temperature to the smart thermostat 104. At step 710, the smart thermostat 104 may regulate the HVAC system 112 in view of the temperature sensed by the temperature sensor 304 of the selected temperature monitoring device 102A.

At step 712, the override module 418 of the smart thermostat 104 may determine that one or more of the fail-safe conditions 419 is/are met. The override module 418 may therefore cause the smart thermostat 104 to revert to controlling the HVAC system 112 in view of the temperature sensed by the temperature sensor 406 of the smart thermostat 104 itself. At step 714, the analytics module 422 may generate an insight 423 alerting the user 110 that the user-input has been overridden. As discussed above, the alert may be a visual alert and/or an audible alert, and may be communicated to the user 110 by one or both of the smart thermostat 104 and the client device 106.

Figure 8:
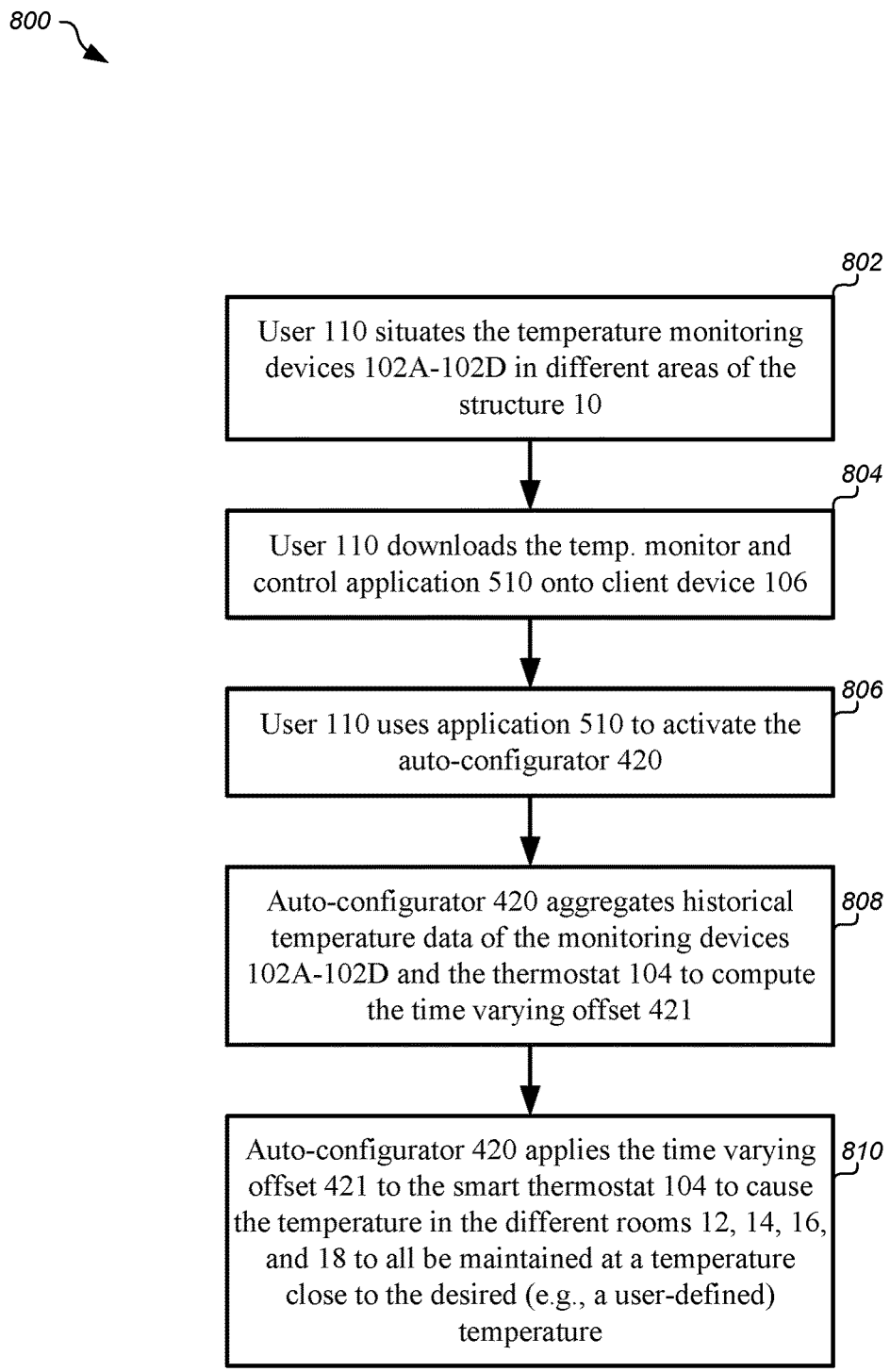
FIG. 8 is a flowchart illustrating yet another method for using the self-learning temperature monitor and control system of FIG. 2, in an embodiment.

Attention is directed now to FIG. 8, which shows yet another example method 800 for using the self-learning temperature monitor and control system 100. At step 802, the user 110 may situate the temperature monitoring devices 102A-102D in different areas of the structure 10. At step 804, the user 110 may download the temperature monitor and control application 510 onto the client device 106. At step 806, the user 110 may use the temperature monitor and control application 510, e.g., the user interface 512 thereof, to activate the auto-configurator 420. At step 808, the auto-configurator 420 may aggregate historical temperature data of the temperature monitoring devices 102A-102D and the thermostat 104 to compute the time varying offset 421, as discussed herein. At step 810, the auto-configurator 420 may apply the time-varying offset 421 to the smart thermostat 104 to cause the temperature in the different rooms 12, 14, 16, and 18 to all be maintained at a temperature close to a desired (e.g., a user-defined) temperature.

Thus, as has been described, the temperature monitor and control system 100 may monitor and evaluate information from temperature monitoring devices 102A-102D and the thermostat 104 to intelligently and robustly control the operation of the HVAC system 112. Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Dynamic Scanning of a Remote Temperature Sensor

The temperature monitor and control system 100 described above may include wireless communications between the temperature monitoring device 102A and the smart thermostat 104. The remainder of this disclosure will focus on an improvement in wireless communication between the temperature monitoring device 102A and the smart thermostat 104 that allows the smart thermostat 104 to reduce the amount of power required to maintain reliable communication between the temperature monitoring device 102A and the smart thermostat 104 without sacrificing the efficiency with which the HVAC system is operated.

In many embodiments, the smart thermostat 104 may be powered at least in part by an energy storage device, such as a capacitor, a super capacitor, a rechargeable battery, and/or the like. For example, some thermostats may not have access to a 110 VAC line voltage from a power outlet, and some thermostats may not have access to a "C" wire that provides power from the HVAC system. These thermostats can harvest power from the call relay and power return wires provided from the HVAC system. The instantaneous amount of energy that can be harvested is relatively small because the current drawn from the HVAC system needs to stay below a threshold that would otherwise trigger the activation of an HVAC function (e.g., air conditioning, heating, fan, etc.). Traditionally, this instantaneous amount of power that could be safely harvested was not enough to power advanced electronic features, such as interactive user interfaces, wireless communications, advanced control algorithms, and so forth. Therefore, some embodiments described herein may include an energy storage device in the smart thermostat 104 that can store energy harvested from the HVAC system when the high-powered features of the smart thermostat 104 are not in use, and can provide energy stored in the energy storage device when the high-powered features of the smart thermostat 104 are in use. The instantaneous power that can be provided from the energy storage device may be greater than the instantaneous power that can be safely harvested from the HVAC system. This enables the smart thermostat 104 to provide advanced features without requiring the user to plug the smart thermostat 104 into a wall outlet or have access to a "C" wire, and this allows the smart thermostat 104 to be installed in virtually any home of any age.

Because the smart thermostat 104 may be reliant upon the energy stored in the energy storage device, high-powered operations on the thermostat may need to be scheduled such that the power draw on the battery does not exceed the amount of power that can be safely harvested from the HVAC system over time. Put another way, using the high-powered features of the thermostat too often can drain a battery/capacitor without giving it sufficient time to recharge. To efficiently limit the power drawn from the energy storage device, the smart thermostat 104 can schedule various systems, chips, processors, and other energy-consuming circuits such that they are in a sleep mode for a majority of their operation. For example, a primary processor (e.g., a main processor or "head unit" processor) may operate in a low-power sleep mode for approximately 95%-99% of the time. The primary processor can temporarily enter into a high-power mode to process wireless communications, control the HVAC system, execute learning algorithms, calculate time-to-temperature, interact with the user interface, and perform other functions that generally do not operate all the time but which do require higher instantaneous power. In another example, the smart thermostat 104 may include a wireless communication module that operates in a sleep mode for a majority of its lifetime. The wireless communication module may wake up to receive wireless communications from a server through a router, to receive wireless indications from other smart-home devices, and/or to send transmissions when HVAC events occur. By minimizing the frequency and/or duration of times when components such as the primary processor and/or the wireless communication module operate in a higher-power mode, the smart thermostat 104 can ensure that the energy storage device remains sufficiently charged.

As described above, the temperature monitor and control system 100 includes both a smart thermostat 104 and a temperature monitoring device 102A. In some embodiments, the temperature monitoring device 102A can communicate with the smart thermostat 104 through a wired communication, such as through an Ethernet cable, through a USB cable, through the electrical power lines of a home wiring installation, and through other wired communications that do not require wireless transmissions. However, many embodiments may place the temperature monitoring device 102A in a room that is separate from the smart thermostat 104. Communication between the temperature monitoring device 102A and the smart thermostat 104 may then use any wireless communication protocol, such as IEEE 802.11, Bluetooth®, Zigbee®, proprietary protocols (e.g., Thread®), and so forth. In these embodiments, the temperature monitoring device 102A may be referred to as a "remote temperature sensor," implying that it is located at least 2 feet away from the smart thermostat 104 (or in a separate room in an enclosure or home) and communicates wirelessly with the smart thermostat 104. Some embodiments of the remote temperature sensor may be powered by a single AA battery, which may provide enough power to operate reliably for at least two years. However, while it may be relatively easy for a user to replace the battery in the remote temperature sensor, it may be relatively difficult for a user to replace the battery in the smart thermostat 104, as the smart thermostat 104 may need to maintain a wireless communication channel with a server, maintain control of the HVAC system, and may be permanently installed on the wall. While some embodiments of the remote temperature sensor can operate efficiently for years on a single battery that can be easily replaced, the smart thermostat 104 generally may need to be more conservative with its power usage. Specifically, turning on the wireless communication module to receive temperature updates from the remote temperature sensor can require more power than the energy storage device of the smart thermostat 104 can provide if the wireless communication module turns on too often.

Figure 9:
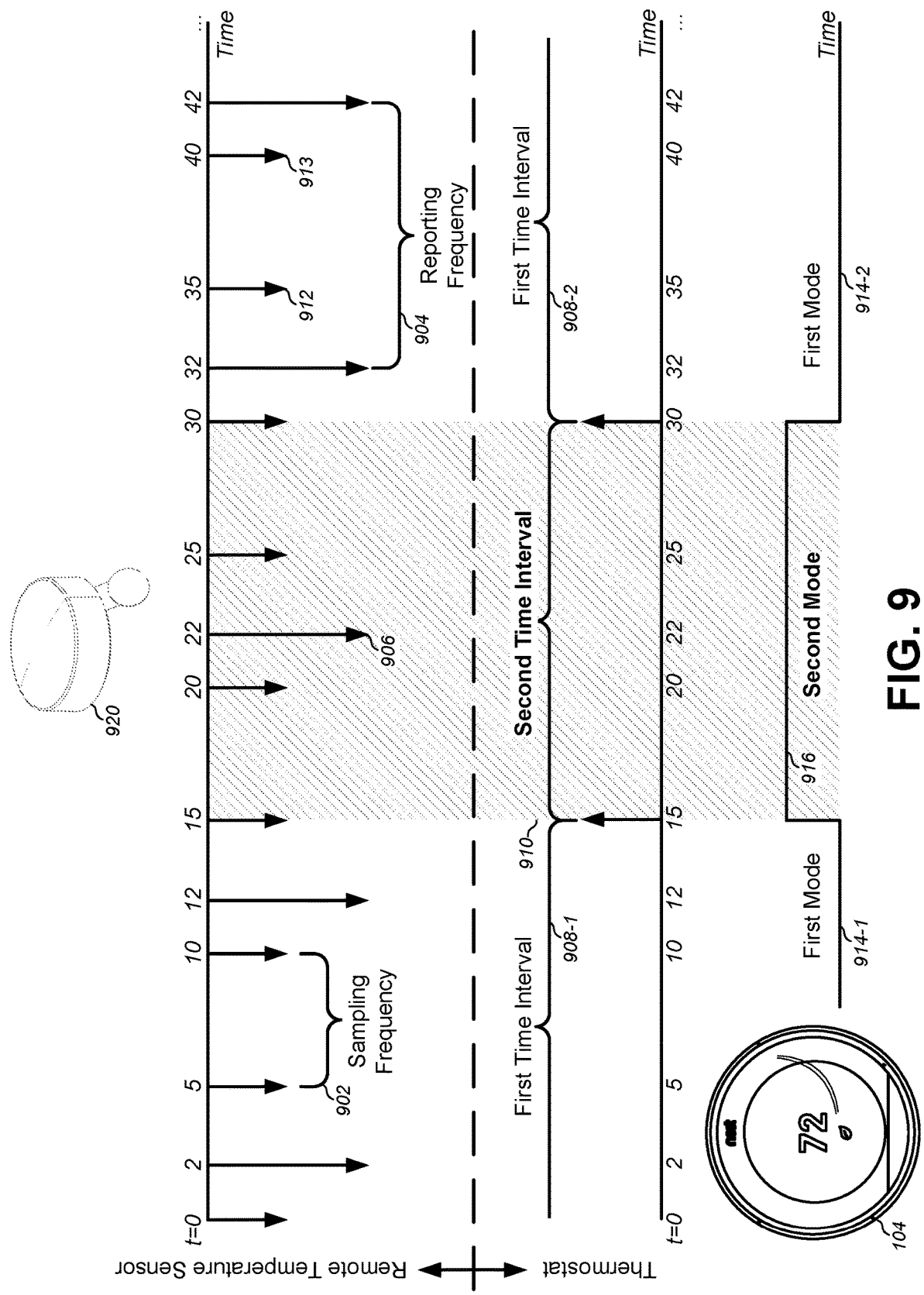
FIG. 9 illustrates a timing diagram for sensor sampling and communicating transmissions between the remote temperature sensor and the smart thermostat, according to some embodiments.

FIG. 9 illustrates a timing diagram for sensor sampling and communicating transmissions between the remote temperature sensor 920 and the smart thermostat 104, according to some embodiments. The top timeline illustrates a sampling frequency 902 and a reporting frequency 904 of the remote temperature sensor 920. Merely by way of example, the sampling frequency 902 is shown to have an interval of approximately 5 seconds. In other embodiments, the sampling frequency 902 can have a time interval of any length, such as 1 second, 2 seconds, 5 seconds, 7 seconds, 10 seconds, 15 seconds, 20 seconds, etc. The sampling frequency 902 may represent a time interval between temperature samples made by the remote temperature sensor 920. For example, the remote temperature sensor 920 can sample and record a temperature measurement every 5 seconds according to the sampling frequency 902.

In addition to the sampling frequency 902, the remote temperature sensor 920 may also use a reporting frequency 904. The reporting frequency may be any frequency having an interval that is larger than the interval of the sampling frequency 902. In this embodiment, the interval of the reporting frequency 904 is approximately 10 seconds. In other embodiments, the reporting frequency 904 may have a time interval of any length, such as 2 seconds, 5 seconds, 10 seconds, 15 seconds, 20 seconds, and so forth. Each time a reporting interval defined by the reporting frequency 904 begins/ends, the remote temperature sensor 920 can send a transmission of one or more of the temperature measurements that were sampled according to the sampling frequency 902 since the last reporting transmission. For example, at time 915, the remote temperature sensor 920 can report the temperatures sampled at time 912 and/or time 913. In some embodiments, the temperatures sampled at time 912 and/or time 913 can be transmitted separately or an average of these two values can be transmitted. In some embodiments, only the most recent temperature sample, such as the temperature sampled at time 913, may be sent.

The bottom timeline in FIG. 9 represents a mode of one or more internal systems of the smart thermostat 104. In some embodiments, this timeline may represent an operational mode of a processor. This timeline may additionally or alternatively represent an operational mode of a wireless communication module. This timeline may additionally or alternatively represent an operational mode of any other circuit that handles or responds to wireless transmissions from the wireless temperature sensor 920. Many processors, chips, circuits, etc., may have multiple operating modes, each of which uses a varying amount of power. For simplicity, two operating modes are referred to in FIG. 9 as a "first mode" and a "second mode." Generally, a component or system of the smart thermostat 104 operating in the second mode may use more average power than when operating in the first mode. In some embodiments, each of the first/second modes may represent groups of modes having similar power usage characteristics. For example, the first mode may represent any group of operating modes that use less than a predetermined threshold amount of power, while the second mode a represent any group of operating modes that use more than a predetermined threshold amount of power, such as 2 mW. In some embodiments, the first mode may be referred to as a "sleep mode" and the second mode may be referred to as a "wake mode." Any processor, chip, module, and/or system in the smart thermostat 104 operating the first mode may transition to the second mode by virtue of an expiration of an internal timer, a reception of a signal on an interrupt pin or input, or any other electrical stimulus or input.

The middle timeline in FIG. 9 represents the time intervals that govern the reception of transmissions by the smart thermostat 104. For simplicity, two time intervals that govern the timing of the smart thermostat 104 may be referred to herein as a "first time interval" and a "second time interval." As described above, the smart thermostat 104 may generally be in the first mode (e.g., a low-power mode or a sleep mode) for the majority of its operating cycle. This timeline illustrates a first time interval 908 during which the smart thermostat 104 may operate in the first mode 914. Periodically, one or more internal systems of the smart thermostat 104 may transition from the first mode 914 to the second mode 916. For example, the one or more internal systems may include a processor and/or a wireless communication module. These one or more internal systems may transition to the second mode 916 in order to receive a transmission of one or more temperature measurements from the remote temperature sensor 920. The time during which the one or more internal systems operates in the second mode 916 is referred to as the second time interval 910.

As illustrated in FIG. 9, there may be an overlap between the second time interval 910 and at least one transmission sent according to the reporting frequency 904 of the remote temperature sensor. For example, the smart thermostat 104 may operate in the first mode 914-1 according to the first time interval 908-1. At the expiration of the first time interval 908-1, an internal timer may expire and/or an interrupt may be triggered such that the one or more internal systems (e.g., the processor and/or the wireless communication module) transition from the first mode 914-1 to the second mode 916. The one or more internal systems may continue to operate in the second mode 916 according to a length of the second time interval 910. During the second time interval 910, at least one temperature-reporting transmission 906 may be sent from the remote temperature sensor 920 to the smart thermostat 104. In order to ensure that at least one transmission 906 occurs during the second time interval 910, the second time interval may be at least as long as the interval of the reporting frequency 904. For example, with a 10 seconds reporting interval associated with the reporting frequency 904, the smart thermostat 104 is guaranteed to receive at least one temperature-reporting transmission during a second time interval having a length of at least 10 seconds, such as the 15 second time interval 910 illustrated in FIG. 9.

The first time interval 908 may be substantially longer than the second time interval 910. For example, a default setting for the first time interval 908 may be 5 minutes, and a default setting for the second time interval 910 may be 10 seconds. However, it has been discovered that using a static setting for the length of the first time interval 908 generates inefficiencies and overshoots in the operation of the HVAC system. As will be described below, some embodiments may dynamically adjust the length of the first time interval 908 to more efficiently operate the HVAC system based on one or more factors, such as an operational state of the HVAC system, one or more missed transmissions from the remote temperature sensor, an estimate of how fast the temperature readings from the remote temperature sensor are approaching a threshold temperature, an output of the thermal model, an output from a mathematical model, an output from a statistical model, and so forth. This dynamic adjustment of the length of the first time interval will be discussed in greater detail below.

Figure 10:
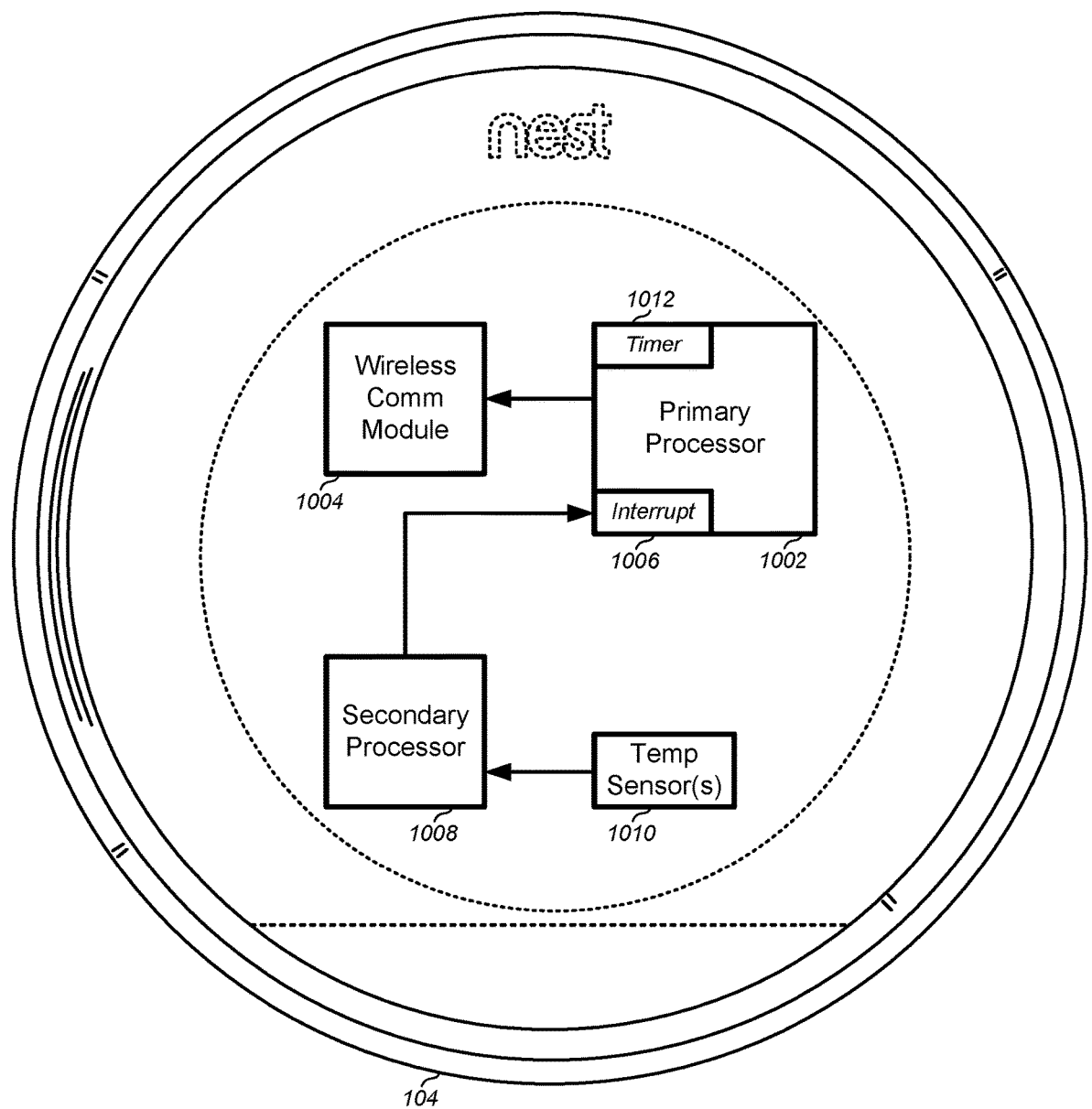
FIG. 10 illustrates a simplified architecture diagram of a smart thermostat, according to some embodiments.

FIG. 10 illustrates a simplified architecture diagram of a smart thermostat 104, according to some embodiments. The smart thermostat 104 may include a primary processor 1002. The primary processor may be programmed to operate in modes corresponding to the first mode and/or the second mode described above. The primary processor 1002 may include one or more internal timers 1012 that can be set to govern the length of the first time interval. For example, the primary processor 1002 can enter a sleep mode (i.e., the first mode) and set the timer 1012 to expire and generate an interrupt at the expiration of the first time interval. In response to the interrupt, the primary processor 1002 can transition from the sleep mode to the wake mode and receive/process temperature readings from the remote temperature sensor 920. In addition to receiving/processing temperature readings from the remote temperature sensor 920, the primary processor 1002 may also enter the wake mode to process HVAC commands, execute temperature management algorithms, execute learning algorithms, drive the user interface, send/receive wireless communications to/from a remote server, and/or other high-power operations.

When receiving transmissions from the remote temperature sensor 920, a wireless communication module 1004 may also transition from a first mode to a second mode as described above. In some embodiments, the wireless communication module 1004 may be physically separate from the primary processor 1002, such as being implemented in a separate integrated circuit (IC) package. In some embodiments, the wireless communication module 1004 may be physically integrated with the primary processor 1002. In these configurations, the wireless communication module 1004 and the primary processor 1002 may be coordinated in their transitions between the first mode and second mode or may transition between the first mode and the second mode independently of each other. In some embodiments, the primary processor 1002 may transition to the second mode first, then cause the wireless communication module 1004 to subsequently transition to the second mode of operation.

In some embodiments, the smart thermostat 104 may also include a secondary processor 1008. The secondary processor 1008 may be a low-power microprocessor that uses less power than the primary processor 1002. While the primary processor 1002 is in the first mode of operation, the secondary processor 1008 can receive temperature sensor measurements 1010 from local temperature sensors that are integrated with the smart thermostat 104 and/or from other external temperature sensors that are configured to communicate with the secondary processor 1008 without requiring the use of the wireless communication module 1004. Settings may be stored in the secondary processor 1008 that can cause a signal to be set to an interrupt pin 1006 on the primary processor 1002. For example, the secondary processor 1008 can store a set of temperature thresholds and/or environmental conditions that when reached cause the secondary processor 1008 to transmit a signal to the interrupt pin 1006 of the primary processor 1002 and wake the primary processor 1002. Some embodiments may use signals or environmental conditions received by the secondary processor 1008 to start and/or end the first time interval described above.

Figure 11A:
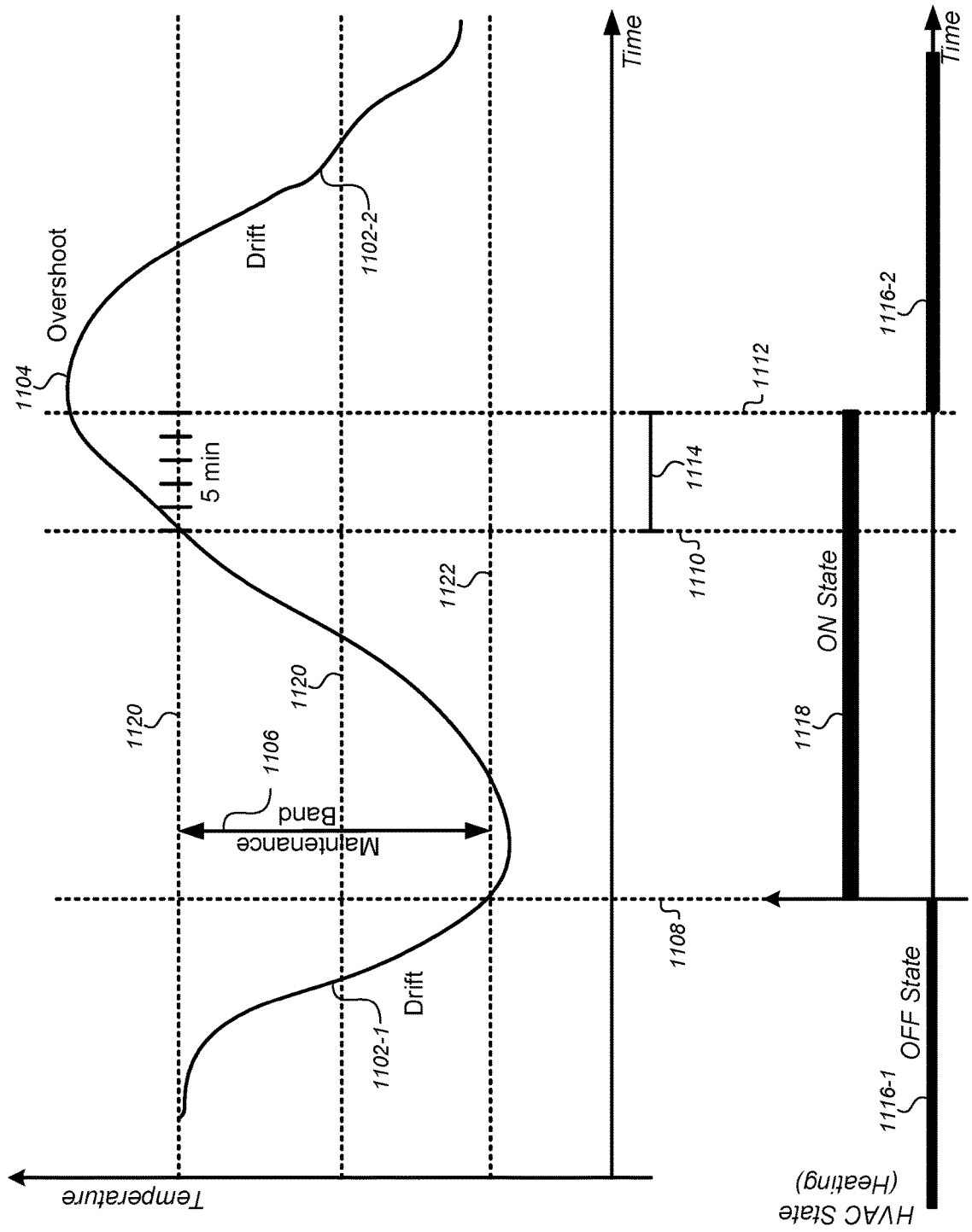
FIG. 11A illustrates a time and temperature graph that details the problem of temperature overshoot and the need for dynamic adjustment of the first time interval, according to some embodiments.

FIG. 11A illustrates a time and temperature graph that details the problem of temperature overshoot and the need for dynamic adjustment of the first time interval, according to some embodiments. A static first time interval of, for example, 5 minutes, can lead to very efficient usage of the energy storage device (e.g., battery) by leaving the processor and/or wireless communication module in the first mode a majority of the time. However, by only receiving temperature measurements from the remote temperature sensor 920 every 5 minutes, the temperature in the room monitored by the remote temperature sensor can overshoot an upper threshold of a maintenance band around the setpoint temperature.

In FIG. 11, the maintenance band 1106 is bounded by upper threshold 1120 and a lower threshold 1122. The maintenance band 1106 may be bounded around a setpoint temperature 1120. The maintenance band 1106 may be a form of hysteresis to prevent the rapid cycling of the HVAC system as the temperature drifts around the setpoint temperature 1120. As the temperature monitored by the remote temperature sensor begins on the left side of the graph, the temperature is in a drift phase 1102-1. In other words, the thermostat is still in a heating mode, but the HVAC system is not actively heating the enclosure. Because the drift phase 1102-1 is still within the maintenance band 1106, the thermostat allows the temperature to drift downwards until it comes close to or crosses the lower threshold 1122.

In the example of FIG. 11A, the HVAC system is in an off state 1116-1 until the temperature drops below the lower threshold 112 at time 1108. At this point, the thermostat causes the state of the HVAC system to enter an on state 1118 (e.g., beginning to heat the enclosure). It can be assumed that the temperature reading indicating that the temperature has dropped below the lower threshold 1122 is immediate in this case. For example, a temperature measurement can be received from the remote temperature sensor at a time very close to time 1108.

After time 1108 with the HVAC system in the on state 1118, the temperature eventually begins to climb upwards towards the upper threshold 1120. At time 1110, the temperature in the enclosure crosses the upper threshold 1120. However, in this case, it may be assumed that the smart thermostat 104 does not receive a temperature measurement from the remote temperature sensor until 5 minutes after the temperature crosses the upper threshold 1120. This can occur when the temperature crosses the upper threshold 1120 soon after the beginning of the first interval 1114. This results in a significant overshoot 1104 of the upper threshold 1120. In practice, this can correspond to overheating the home, which wastes energy and leads to user discomfort. Sample data from actual smart thermostats installed in user homes showed that more than 40% of heating events resulted in overshoot of the temperature in the home above the desired setpoint temperature. Test data indicates that the thermal response of some homes can be as fast as 0.25, degrees Fahrenheit per minute. A typical maintenance band may be approximately 0.70 degrees Fahrenheit. Therefore, using a length for the first time interval that is more than a few minutes can result in temperature overshoot of a few degrees.

At time 1112, the temperature measurement from the remote temperature sensor may be received by the smart thermostat 104. The smart thermostat 104 can cause the HVAC system to begin to transition to the off state 1116-2, and the temperature curve will again eventually begin a drift phase 1102-2 back towards the lower threshold 1122. It will be understood that the example of FIG. 11A illustrates heating a home. The same problem can occur at the lower threshold 1122 as was illustrated to occur at the upper threshold 1120 depending on how the temperature curve corresponds with the first time interval described above. Additionally, it will be understood that the same problem can occur with cooling a home, resulting in overshoots of the temperature curve that can allow a home to get too warm or to be over-cooled, which can both lead to user discomfort and wasted energy.

FIG. 11A thus illustrates a technical problem in the field of efficient temperature control using HVAC system. In embodiments that use remote temperature sensors, using a first time interval that is too long will result in temperature overshoots and wasted energy. Using a first time interval that is too short will drain the battery and cause the smart thermostat 104 to stop functioning. Therefore, the embodiments described herein solve this technical problem by introducing a new algorithm that ascertains the state of the HVAC system and uses other state variables in the thermostat to dynamically adjust the length of the first time interval to balance temperature overshoots versus battery usage.

Figure 11B:
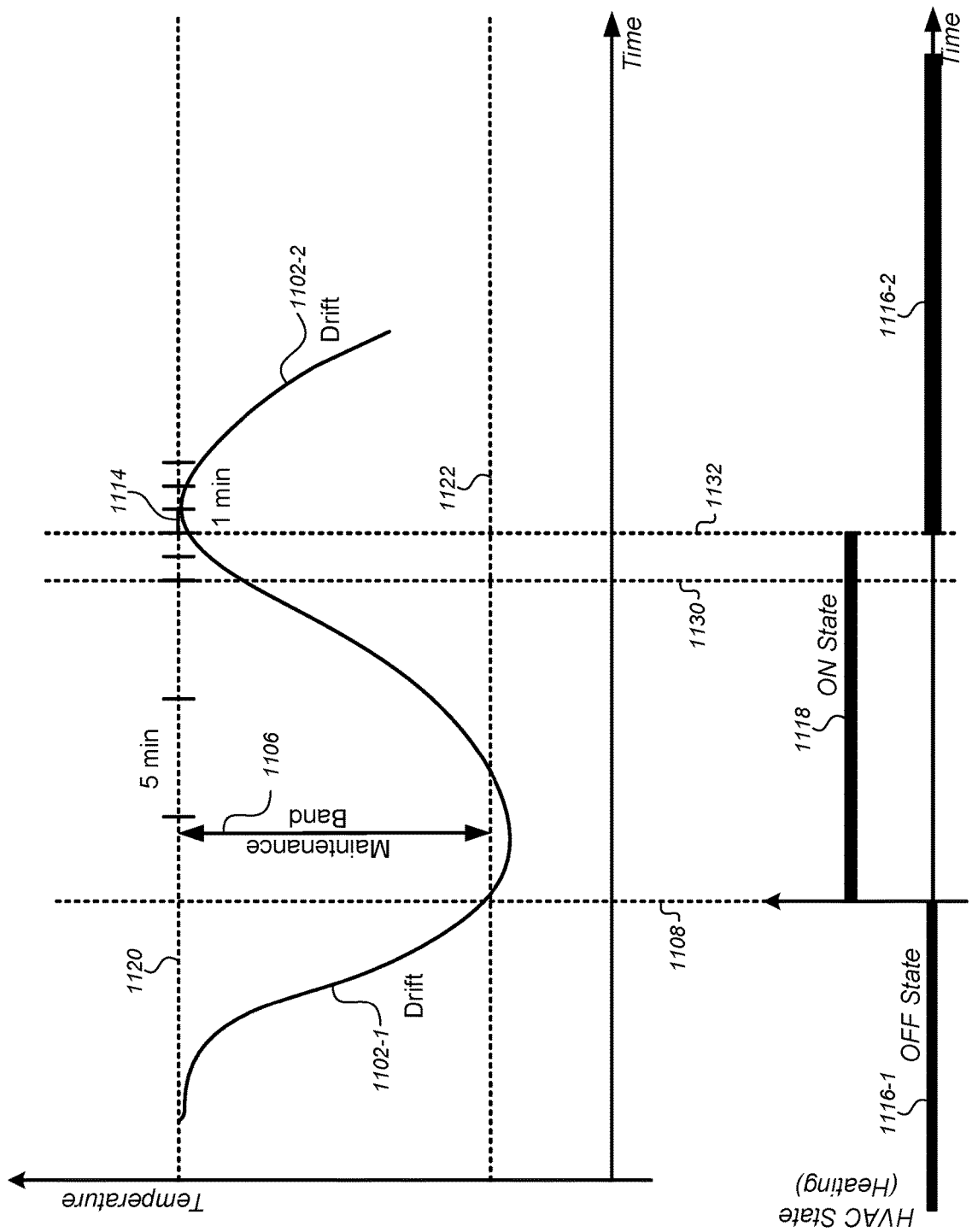
FIG. 11B illustrates a time and temperature graph using dynamic time interval adjustment to minimize temperature overshoots and maximize battery efficiency, according to some embodiments.

FIG. 11B illustrates a time and temperature graph using dynamic time interval adjustment to minimize temperature overshoots and maximize battery efficiency, according to some embodiments. This graph is similar to the graph of FIG. 11A, the difference being that the first interval 1114 has been reduced to 1 minute rather than 5 minutes as the temperature approaches the upper threshold 1120. As the temperature increases prior to time 1130, the system can monitor how quickly the temperature is approaching the upper threshold 1120. For example, the system can monitor the temperature distance from the upper threshold 1120 and/or as the velocity with which the temperature approaches the threshold 1120. After the distance and/or velocity exceeds a predetermined threshold, the length of the first time interval 1114 can be decreased from 5 minutes to 1 minute. When the length of the first time interval is reduced to 1 minute, the system can respond faster as the temperature approaches the upper threshold 1120. For example, the smart thermostat 104 can cause the HVAC system to switch back to the off state 1116-2 at time 1132 in order to avoid a temperature overshoot that goes significantly above the upper threshold 1120.

Changing the length of the first time interval from 5 minutes to 1 minute is used only as an example is not meant to be limiting. Any times for the lengths of the first time interval may be used. Note that the length of the first time interval can remain relatively long (e.g., 5 minutes) for much of a heating/cooling cycle. This maintains the charge on the energy storage device to power the smart thermostat 104. However, when the smart thermostat 104 determines that the temperature is approaching the upper/lower threshold 1120, 1122 of the maintenance band 1106, the smart thermostat 104 can dynamically decrease the length of the first time interval. This may turn on the wireless communication module and/or the processor more often to receive more up-to-date temperature readings from the remote temperature sensor. Put another way, the dynamic adjustment of the length of the first time interval increases the sampling rate of the remote temperature readings by the smart thermostat 104 at critical times when it is most useful in preventing overshoot while still minimizing the drain on the battery. Test data has indicated that dynamically adjusting the length of the first time interval can solve the technical problem described above of preventing temperature overshoots while still ensuring that the energy storage device remains adequately charged. The embodiments described herein that dynamically adjust the length of the first time interval based on how fast the temperature is approaching the upper/lower threshold have been shown to only increase the number of transitions from the first mode to the second mode (e.g., transitioning from sleep to wake to receive temperature transmissions from the remote temperature sensor) by less than 10% per day. In contrast, using a static time interval that is short enough to eliminate overshoot (e.g., 1 minute) without a dynamic adjustment increased the number of transitions from the first mode to the second mode by over 400% per day and caused the battery voltage to fall below its minimum threshold.

Figure 12:
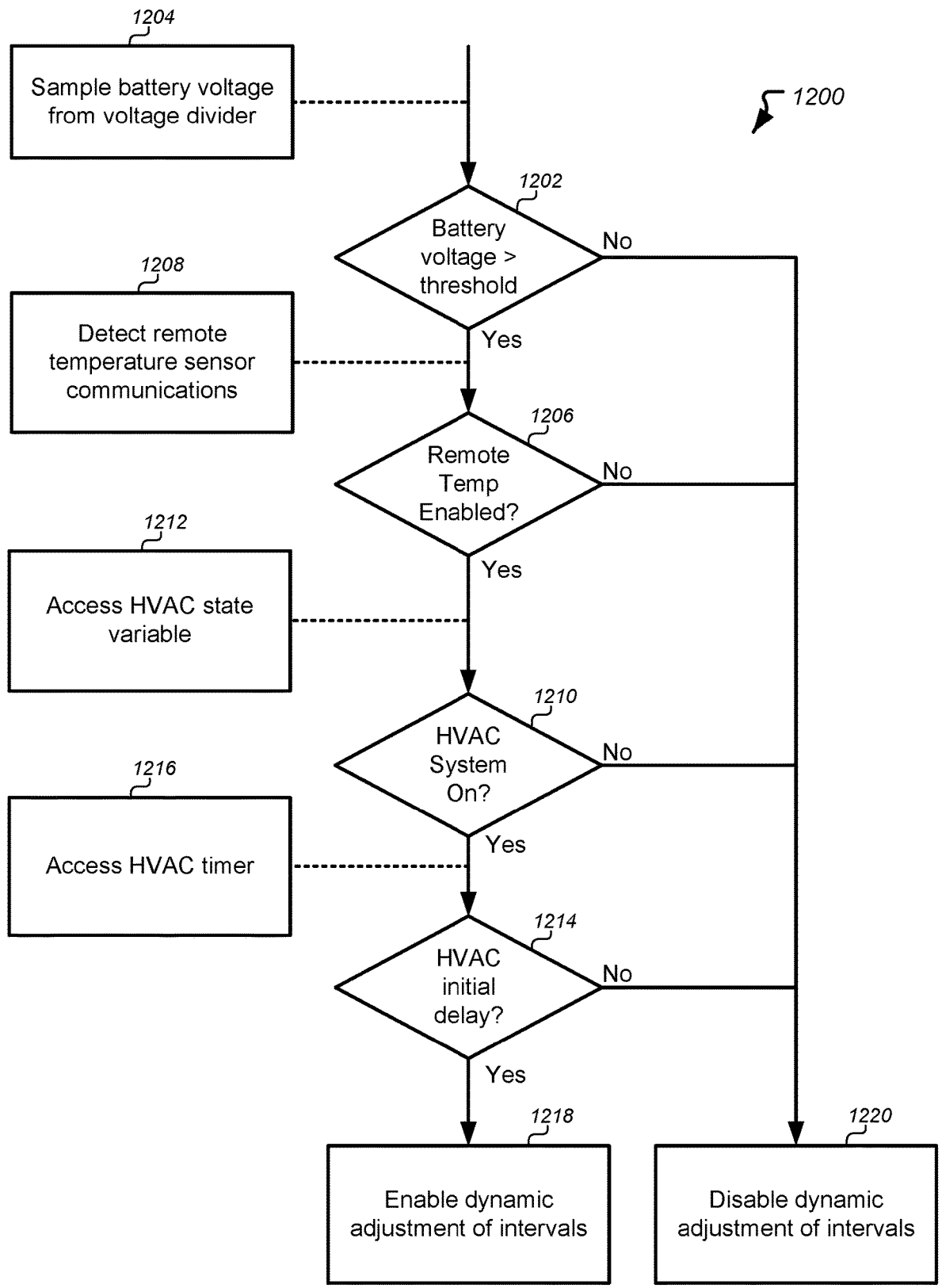
FIG. 12 illustrates a flowchart of a method for enabling and disabling dynamic adjustment of the length of the first time interval, according to some embodiments.

FIG. 12 illustrates a flowchart 1200 of a method for enabling and disabling dynamic adjustment of the length of the first time interval, according to some embodiments. As illustrated above in FIGS. 11A-11B, the system can maintain a relatively long first time interval for the majority of its operating cycle as a default. For example, a default first time interval of 5 minutes or 10 minutes may be sufficient to protect the charge on the energy storage device during normal operations. Some embodiments may utilize measurements from other hardware/software systems on the smart thermostat 104 before enabling the dynamic adjustment of the length of the first time interval.

The method may include determining whether a voltage or charge amount stored on the energy storage device is above a predetermined threshold (1202). For example, some embodiments may require that a battery voltage be above 3.8 V. Some embodiments may add a hysteresis band around the battery voltage threshold. For example, the dynamic adjustment of the first time interval may be disabled at 3.8 V and then re-enabled at 3.85 V on the battery. The battery voltage may be obtained through an analog-to-digital converter on the primary processor that is coupled to a terminal of the energy storage device. The battery voltage may also be obtained using a voltage divider circuit comprising a plurality of resistors that measure voltage on the energy storage device. If the battery voltage is not above the predetermined threshold, then the dynamic adjustment of intervals can be disabled (1220). For example, if the battery voltage is too low, then the length of the first time interval can remain at its default value to ensure that the battery is not drained.

The method may also include determining whether the system is using a remote temperature sensor (1206). In some embodiments, remote temperature sensors can be added to the temperature monitoring and control system 100 dynamically. For example, remote temperature sensors can be added to multiple rooms in a home to interact with a central smart thermostat 104. Therefore, the method may include determining whether any remote temperature sensors are currently registered with and/or sending communications to the smart thermostat 104. In some embodiments, this can be detected by receiving wireless communications from remote temperature sensors (1208). In other embodiments, this can be determined by accessing memory contents that indicate a remote temperature sensor has been previously registered with the smart thermostat 104. If no remote temperature sensors are currently in use by the smart thermostat 104, then dynamic adjustment of the first time interval can be disabled because the on-board temperature sensors of the smart thermostat 104 can be polled using a low-power microcontroller without waking the primary processor and/or wireless communication module as described above.

The method may further include determining whether control of the HVAC system is currently "on" (1210), or whether the thermostat is currently causing the HVAC to heat or cool the enclosure. As described above, control of the HVAC system may be "on" while the HVAC system is not actively cooling/heating. Because of the maintenance band around a setpoint temperature, the HVAC system may be allowed to drift up/down until nearing or crossing the upper/lower threshold of the maintenance band. Therefore some embodiments may access state variables stored on the smart thermostat 104 to determine whether the smart thermostat 104 is actively controlling the HVAC system (1212), for example, in a heating or cooling cycle, even if the HVAC system itself is currently off. Some embodiments may then also determine that the HVAC system is not being allowed to drift during the current HVAC cycle. Temperature changes due to drift may be much slower than temperature changes due to active cooling/heating. Therefore, the default first time interval can be used if the system is drifting (1220), while dynamic adjustment of the first time interval may be allowed when the HVAC system is actually heating/cooling.

The method may further include disabling dynamic adjustment of intervals during an initial delay after an HVAC cycle initiation (1214). Rapid cycling of the HVAC system can be very inefficient and can damage the HVAC system over time. Therefore, the smart thermostat 104 can develop a schedule that tries to ensure that the HVAC system will be active for at least a minimum time interval once activated. For example, the smart thermostat 104 may attempt to cause the HVAC system to not begin heating then turn off 2 minutes later. Because an HVAC heating/cooling cycle will run for at least a minimum amount of time, the system can institute a delay after activating a heating/cooling cycle where the default value for the first time interval may be maintained regardless of how quickly the temperature is approaching the upper/lower threshold during the delay. Internally, the processor may activate a timer that can be monitored by this method and/or may generate an interrupt when the initial delay assigned to the current HVAC cycle expires (1216).

If each of the conditions described above in flowchart 1200 are met, the system can temporarily enable dynamic adjustment of the length of the first time interval (1218). This method may be carried out periodically (e.g., every 1 minute, every 2 minutes, etc.) During operation of the smart thermostat 104. This method may alternatively or additionally be carried out each time the first time interval expires and the primary processor wakes up to receive a transmission from the remote temperature sensor. In some embodiments, this method may be carried out periodically after the smart thermostat 104 causes the HVAC system to begin heating/cooling. In some embodiments, this method may be carried out after receiving temperature data from the remote temperature sensor and/or after updating a control decision for the HVAC system, such as activating a heating/cooling function.

Figure 13:
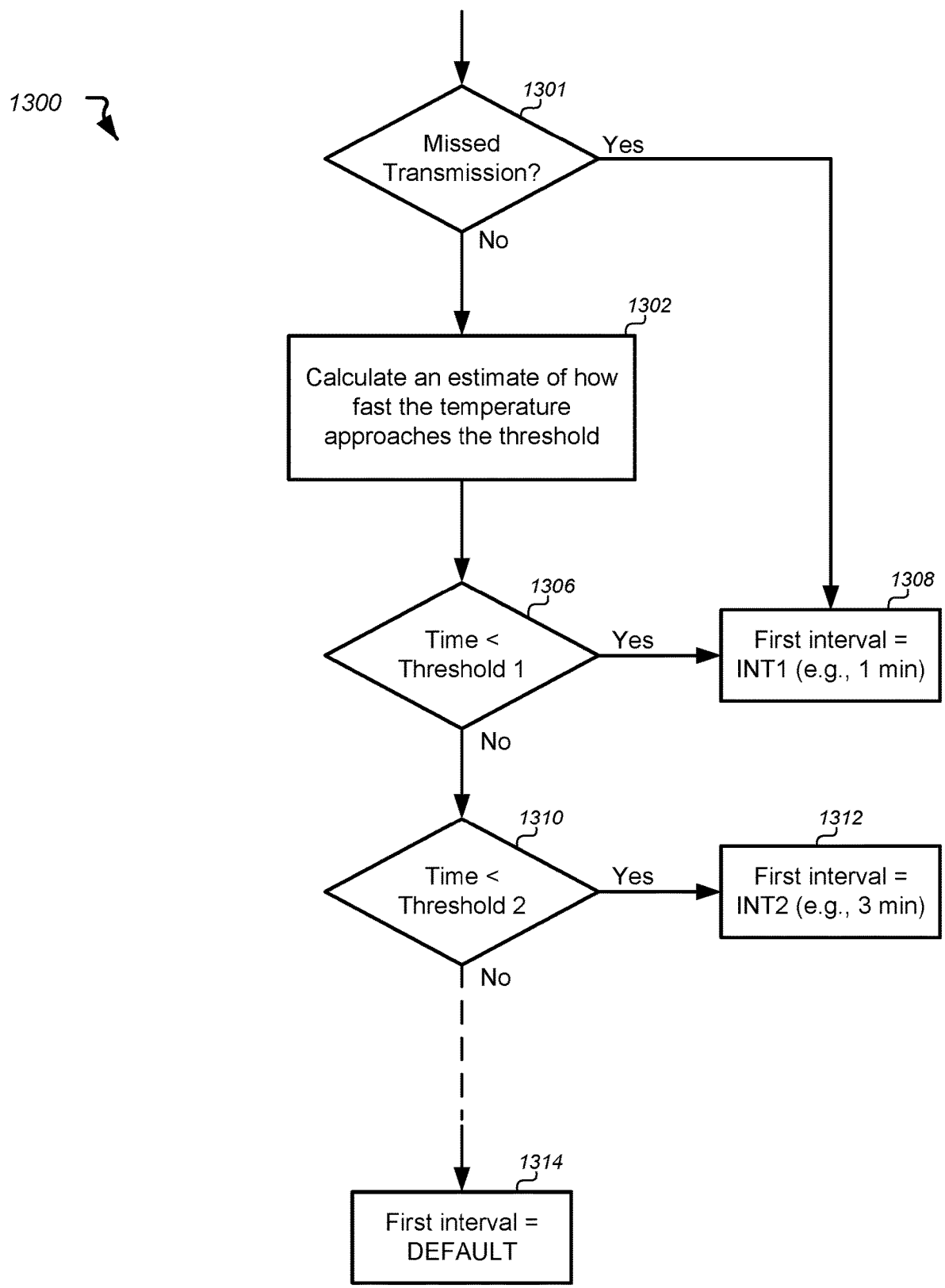
FIG. 13 illustrates a flowchart of a method for dynamically adjusting a length of the first time interval, according to some embodiments.

FIG. 13 illustrates a flowchart 1300 of a method for dynamically adjusting a length of the first time interval, according to some embodiments. This method may be carried out after the method of flowchart 1200 that enables the dynamic adjustment of the first time interval. This method may include determining whether a previous expected transmission from the remote temperature sensor was unsuccessful (1301). At the expiration of the first time interval, the smart thermostat 104 may cause the processor, wireless communication module, etc., to wake up and enter the second mode of operation for at least a length of time governed by a second time interval as described above. During the second time interval, a temperature transmission from the remote temperature sensor may be expected. If the second time interval expires and no transmission was received from the remote temperature sensor, the smart thermostat 104 can cause the length of the first time interval to be dynamically adjusted to a predetermined time (1308). In some embodiments, the shortest time for the first time interval (e.g., 1 minute) may be selected in response to a missed transmission to ensure that up-to-date temperature information is received as soon as possible from the remote temperature sensor.

The method may also include calculating an estimate of how fast the temperature approaches the upper/lower threshold (1302). When the smart thermostat 104 is set to heat, this may be an estimate of how fast the temperature approaches the upper threshold of the maintenance band. When the smart thermostat 104 is set to cool, this may be an estimate of how fast the temperature approaches the lower threshold of the maintenance band. In some embodiments, this method may include determining a temperature velocity as temperature changes over time. This velocity may be used to estimate a time-to-temperature for reaching the upper/lower threshold. In some embodiments, this may include estimating a time-to-temperature using a thermal, mathematical, or statistical model of the room in which the remote temperature sensor is installed. In some embodiments, this may include determining an absolute temperature difference from the upper/lower threshold. Each of these techniques is described in greater detail below.

The method may further include comparing the estimated time to reach the upper/lower threshold of the maintenance band to one or more time thresholds, each of which is associated with an adjusted length for the first time interval. For example, if the estimated time to reach the upper/lower threshold is less than 3 minutes (1306), the length of the first time interval can be dynamically adjusted to be approximately 1 minute (1308). Next, if the estimated time to reach the upper/lower threshold is less than 5 minutes (1310), then the length of the first time interval can be dynamically adjusted to be approximately 3 minutes (1312). Successively longer time thresholds can be associated with successively longer times for the first time interval. If the estimated time to reach the upper/lower threshold is not less than any of these successive time thresholds, then a default length of the first time interval can be used (1314), such as 5 minutes or 10 minutes.

The method may optionally include using additional factors to adjust the first time interval. For example, some embodiments may use thermal characteristics of the home along with the most recent temperature readings received from the remote temperature sensor. Some embodiments may also use historical temperature data and recent temperature trends to determine how the first time interval should be adjusted. Some embodiments may also use a user preference or user-specified comfort level. For example, a user preference for maintaining a steady temperature and reducing overshoot (e.g., "comfort vs. efficiency") may cause the length of the first time interval to be shortened more than would otherwise be required by this algorithm.

Figure 14:
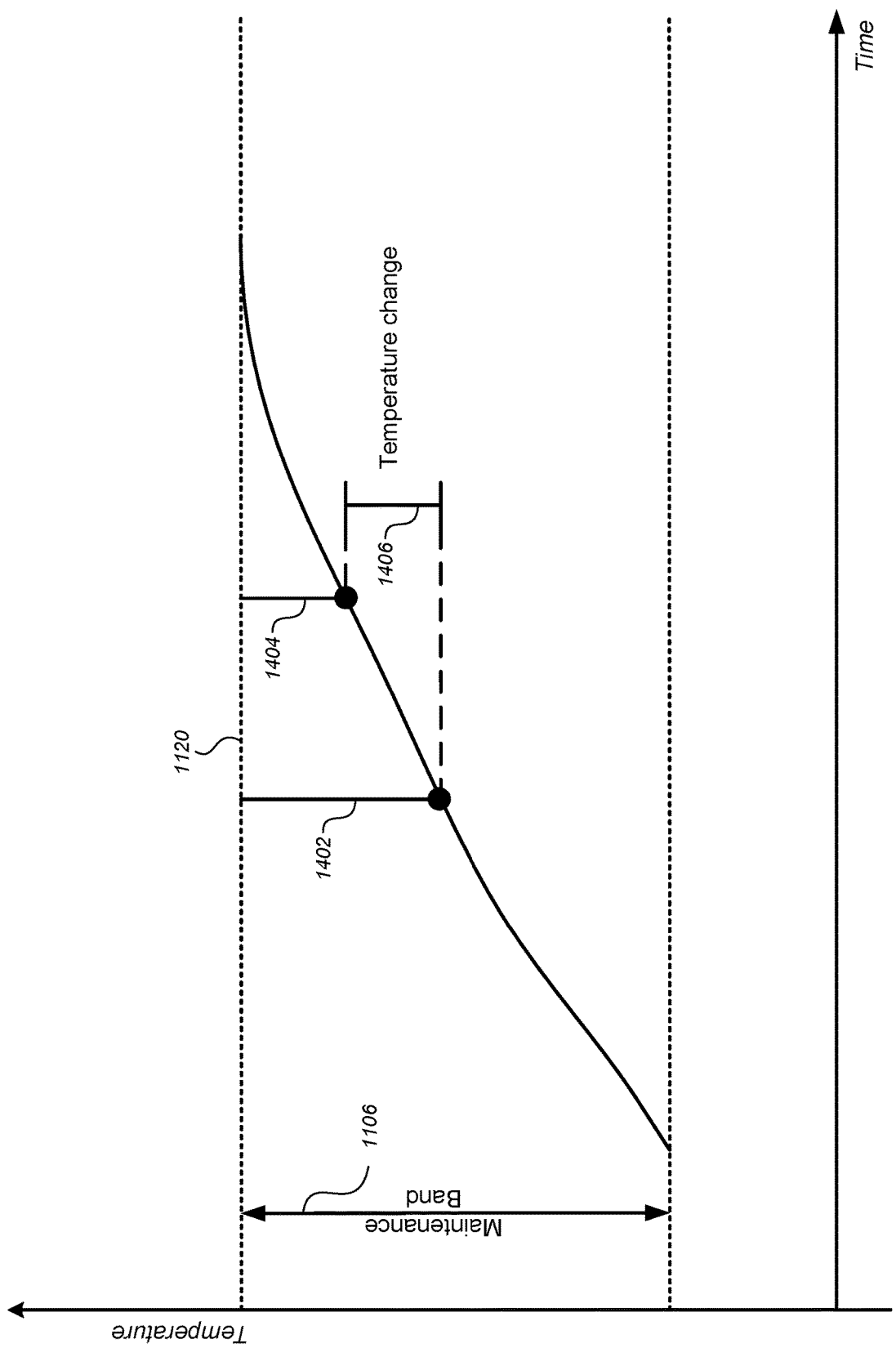
FIG. 14 illustrates a method of determining how fast the temperature readings from the remote sensor are approaching a threshold temperature using a temperature velocity, according to some embodiments.

FIG. 14 illustrates a method of determining how fast the temperature readings from the remote sensor are approaching a threshold temperature using a temperature velocity, according to some embodiments. As temperature readings are received from the remote temperature sensor, they can be stored by the smart thermostat 104. When a new temperature reading is received, it can be compared to a previous temperature reading to determine a change in "distance" from the upper/lower threshold. In this example, distance may be measured by subtracting the current temperature and/or the previous temperature from the upper threshold 1120. This may yield a current distance 1404 and a previous distance 1402. The difference between the current distance 1404 and the previous distance 1402 can indicate a temperature change between successive readings. Temperature velocity can then be calculated by dividing the temperature change by the length of the first time interval. An estimated time-to-temperature can then be calculated by dividing the current temperature difference 1404 by the calculated temperature velocity. For example, the following pseudo code may be used to calculate a temperature velocity.

PreviousDistance=Threshold−PreviousTemp

CurrentDistance=Threshold−CurrentTemp

Velocity=(CurrentDistance−PreviousDistance)/Interval

Time=CurrentDistance/Velocity

In some embodiments, a sign convention may be imposed on the distances and velocities calculated above. For example, distances from an upper threshold may be positive and distances from the lower threshold may be negative. The sign convention can then be imposed based on the type of HVAC function. For example, a heating function may impose a positive sign convention, while a cooling function may impose a negative sign convention in order to keep calculations consistent.

Figure 15:
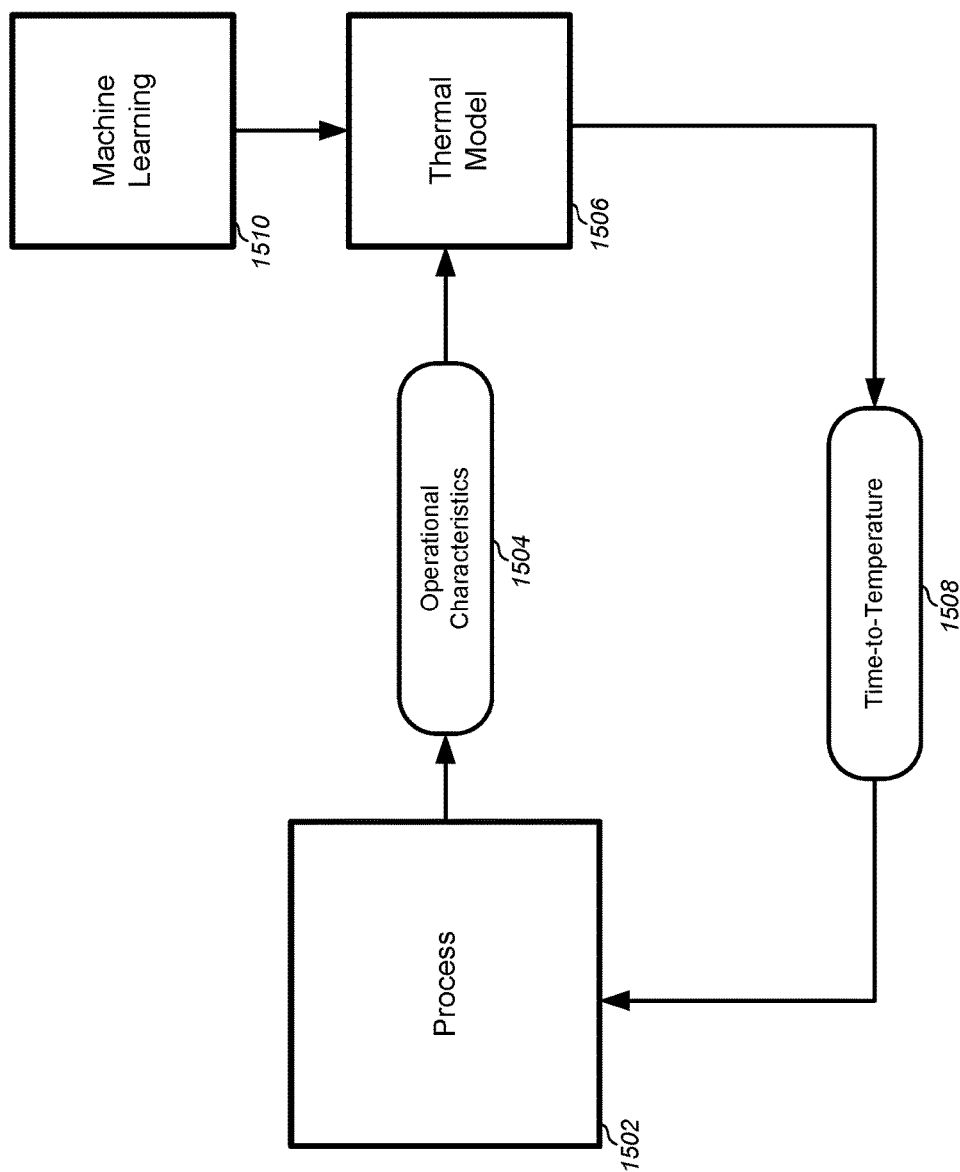
FIG. 15 illustrates a block diagram for using a thermal model to estimate a time-to-temperature for dynamically adjusting the length of the first interval, according to some embodiments.

FIG. 15 illustrates a block diagram for using a thermal model 1506 to estimate a time-to-temperature for dynamically adjusting the length of the first interval, according to some embodiments. The process described above in FIG. 13 is depicted as a process 1502 in this example. The process 1502 for dynamically adjusting the length of the first time interval may be carried out on a primary processor of the smart thermostat 104. The process 1502 may send operational characteristics 1504 to a thermal model process 1506. The operational characteristics 1504 may include an operating state of the HVAC system, temperature readings received from the remote temperature sensor, times and/or velocities associated with temperature measurements, a location of the remote temperature sensor, a current length of the first time interval, and/or other information related to estimating a time-to-temperature of the current HVAC cycle.

In some embodiments, the thermal model process 1506 may store thermal models that predict a response of a home—or of a specific room within a home—to different HVAC functions. The thermal model process 1506 can select an appropriate thermal model based on the location of the remote temperature sensor and/or the current thermal characteristics of that location. The thermal model process 1506 can then calculate an estimated time-to-temperature 1508 that can be transmitted back to the process 1502 and used to dynamically adjust a length of the first time interval.

In some embodiments, the thermal model process 1506 may be executed by the primary processor of the smart thermostat 104. In some embodiments, the thermal model process 1506 may be executed by a remote server that interacts with and receives information from the smart thermostat 104. Thus, the process 1502 can transmit the operational characteristics 1504 over a network to the server executing the thermal model process 1506, and the server can then transmit the time-to-temperature 1508 back to the process 1502. Because storing, generating, and calculating values using a thermal model may be a power-intensive process, this can be done by the remote server to lessen the processing and power burden placed upon the smart thermostat 104. In some embodiments, both the process 1502 for adjusting the length of the first time interval and the thermal model process 1506 may be executed on the remote server. In these embodiments, the smart thermostat 104 can transmit the operational characteristics 1504 to the server, and the server can then transmit the adjusted length of the first time interval back to the smart thermostat 104.

In some embodiments, the device operating the thermal model process 1506 may also use a machine learning process 1510. This can be used to evaluate results from previous adjustments of the first time interval. For example, if a previous operation of the algorithm adjusted the length of the first time interval from 5 minutes to 3 minutes, and the readings from the remote temperature sensor indicated that a temperature overshoot still occurred, the machine learning process 1510 can adjust the thresholds associated with certain times-to-temperature. In this example, the interval length in FIG. 13 can be changed from 3 minutes to 2 minutes for a specific time. Additionally, some embodiments may also adjust the parameters of the thermal model used for the room in which the remote temperature sensors installed. Thus, the dynamic adjustment of the length of the first time interval can be dialed in over time to gradually adapt specifically to the HVAC cycles and thermal environment of each individual home/room.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A thermostat comprising:
a wireless communication circuit that receives temperature readings from a remote temperature sensor;
a processor that operates in a plurality of modes, wherein the plurality of modes comprises:
a first mode; and
a second mode, wherein the processor uses more average power when operating in the second mode than when operating in the first mode;
a memory comprising instructions that, when executed by the processor, cause the processor to:
cause a heating, ventilation, and air conditioning (HVAC) system to operate in a first state;
while the HVAC system is operating in the first state, repeatedly transition between operating in the first mode and operating in the second mode, wherein:
transitions from operating in the first mode to operating the second mode are caused at least in part by an expiration of a first time interval;
transitions from operating in the second mode to operating in the first mode are caused at least in part by an expiration of a second time interval; and
the wireless communication circuit is configured to receive one or more of the temperature readings from the remote temperature sensor while the processor is operating in the second mode; and
adjust a length of the first time interval based at least in part on an estimate of how fast the temperature readings from the remote temperature sensor are approaching a threshold temperature relative to a setpoint temperature of the thermostat.

2. The thermostat of claim 1, wherein the first mode comprises a sleep mode.

3. The thermostat of claim 2, wherein when the processor is operating in the sleep mode, the wireless communication circuit also operates in the sleep mode.

4. The thermostat of claim 1, wherein the second time interval is approximately 10 seconds.

5. The thermostat of claim 1, wherein the memory and the processor are part of a same integrated circuit (IC) package.

6. The thermostat of claim 1, wherein the processor and the wireless communication circuit are implemented in separate IC packages.

7. The thermostat of claim 1, wherein adjusting the length of the first time interval is also based at least in part on a determination of whether the thermostat has transitioned from operating in the second mode to operating the first mode without receiving the one or more of the temperature readings from the remote temperature sensor.

8. The thermostat of claim 1, wherein the threshold temperature comprises an upper or lower boundary of a maintenance band.

9. A method of receiving transmissions from remote temperature sensors by a thermostat, the method comprising:
receiving temperature readings from a remote temperature sensor through a wireless communication circuit;
operating a processor in a plurality of modes, wherein the plurality of modes comprises:
a first mode; and
a second mode, wherein the processor uses more average power when operating in the second mode than when operating in the first mode;
causing a heating, ventilation, and air conditioning (HVAC) system to operate in a first state;
while the HVAC system is operating in the first state, repeatedly transitioning the processor between operating in the first mode and operating in the second mode, wherein:
transitions from operating in the first mode to operating the second mode are caused at least in part by an expiration of a first time interval;
transitions from operating in the second mode to operating in the first mode are caused at least in part by an expiration of a second time interval; and the wireless communication circuit is configured to receive one or more of the temperature readings from the remote temperature sensor while the processor is operating in the second mode; and adjusting a length of the first time interval based at least in part on an estimate of how fast the temperature readings from the remote temperature sensor are approaching a threshold temperature relative to a setpoint temperature of the thermostat.

10. The method of claim 9, wherein adjusting the length of the first time interval is also based at least in part on a determination of whether the HVAC system is actively heating or cooling.

11. The method of claim 9, further comprising:
determining to enable the adjusting of the length of the first time interval.

12. The method of claim 11, wherein determining to enable the adjusting of the length of the first time interval is based at least in part on a voltage or charge stored on an energy storage device.

13. The method of claim 11, wherein determining to enable the adjusting of the length of the first time interval is based at least in part on whether the HVAC system is being allowed to drift.

14. The method of claim 11, wherein determining to enable the adjusting of the length of the first time interval is based at least in part on when a delay following an initiation of an HVAC function has expired.

15. The method of claim 9, wherein the estimate of how fast the temperature readings from the remote temperature sensor are approaching the threshold temperature relative to a setpoint temperature of the thermostat comprises a determination of a time-to-temperature based on a thermal model of a room in which the remote temperature sensor is installed.

16. The method of claim 9, wherein the estimate of how fast the temperature readings from the remote temperature sensor are approaching the threshold temperature relative to a setpoint temperature of the thermostat comprises a determination of a time-to-temperature based on a temperature velocity.

17. The method of claim 16, wherein the temperature velocity comprises a difference between successive temperature readings from the remote temperature sensor divided by a current length of the first time interval.

18. The method of claim 9, further comprising:
determining whether a previous adjustment to the length of the first time interval resulted in a temperature overshoot.

19. A temperature monitor and control system comprising:
a remote temperature sensor installed in a first room in an enclosure;
a thermostat installed in a second room in the enclosure, wherein the thermostat is configured to perform operations comprising:
receiving temperature readings from the remote temperature sensor through a wireless network;
operating a processor in a plurality of modes, wherein the plurality of modes comprises:
a first mode; and
a second mode, wherein the processor uses more average power when operating in the second mode than when operating in the first mode;
cause a heating, ventilation, and air conditioning (HVAC) system to operation in a first state;
while the HVAC system is operate in the first state, repeatedly transitioning the processor between operating in the first mode and operating in the second mode, wherein:
transitions from operating in the first mode to operating the second mode are caused at least in part by an expiration of a first time interval;
transitions from operating in the second mode to operating in the first mode are caused at least in part by an expiration of a second time interval; and
the thermostat is configured to receive one or more of the temperature readings from the remote temperature sensor while the processor is operating in the second mode; and
adjusting a length of the first time interval based at least in part on an estimate of how fast the temperature readings from the remote temperature sensor are approaching a threshold temperature relative to a setpoint temperature of the thermostat.

* * * * *